United States Patent [19]
Mutoh

[11] Patent Number: 5,923,708
[45] Date of Patent: Jul. 13, 1999

[54] DECODING CIRCUIT FOR A READ SIGNAL FROM A MAGNETIC RECORDING AND READING SYSTEM USING PARTIAL RESPONSE

[75] Inventor: Hiroshi Mutoh, Kawasaki, Japan

[73] Assignee: Fujitsu Limited, Kawasaki, Japan

[21] Appl. No.: 08/595,599

[22] Filed: Feb. 2, 1996

[30] Foreign Application Priority Data

Feb. 7, 1995 [JP] Japan ................................... 7-019217

[51] Int. Cl.⁶ .................................................. H03H 7/30
[52] U.S. Cl. ........................... 375/233; 375/232; 370/291
[58] Field of Search .................................. 375/229, 230, 375/233, 262, 266, 341, 345, 232; 360/65, 55, 62; 370/290, 291, 292

[56] References Cited

U.S. PATENT DOCUMENTS

| | | | |
|---|---|---|---|
| 5,166,955 | 11/1992 | Ohta ......................................... | 375/229 |
| 5,321,559 | 6/1994 | Nguyen et al. ............................ | 360/65 |
| 5,586,144 | 12/1996 | Kahlman et al. ........................ | 375/229 |
| 5,598,432 | 1/1997 | Wei ........................................ | 375/229 |
| 5,625,505 | 4/1997 | Ohmori et al. .......................... | 375/341 |

OTHER PUBLICATIONS

Moon et al.; "Performance Comparison of Detection Method in Magnetic Recording"; IEEE Transactions on Magnetics, vol. 26, Nov. 1990, pp. 3155–3172.

Primary Examiner—Jason Chan
Assistant Examiner—Conguan Tran
Attorney, Agent, or Firm—Greer, Burns & Crain, Ltd.

[57] ABSTRACT

A decoding circuit for a magnetic recording and reading system enables the implementation of an AGC loop with a relatively simple configuration and further enables easy clock extraction and high operating speed. The level setting system for setting the signal level to be taken as the value 1 in the decoding circuit is configured so as to comprise a variable-gain amplifier, a PR4 equalizer having characteristics capable of equalizing to a target PR4 equalization waveform, and a level detector which feeds the output signal back to the variable-gain amplifier as an AGC loop control signal to control the gain thereof. The detection system of the decoding circuit is configured so as to comprise a VFO which generates a system clock fs, and a decision feedback type decoding means in a decision section, which decodes data lines which appear at the output of the PR4 equalizer. In doing this, by configuring the decision feedback type decoding means so as to comprise a decoding means for even data lines and a decoding means for odd data lines, it is possible to reduce the system clock frequency to one half, thereby enabling an increase in the speed of decoding.

33 Claims, 20 Drawing Sheets

DECODING CIRCUIT FOR A READ SIGNAL FROM A MAGNETIC RECORDING AND READING SYSTEM USING PARTIAL RESPONSE

BACKGROUND OF THE INVENTION

1. Field of the Invention

The present invention relates to a decoding circuit for a playback signal in a magnetic recording and reading system which uses, and, more particularly, to a decoding circuit for a magnetic recording and reading system which decodes, pulse data from a playback signal of a head of a magnetic disk apparatus.

2. Description of the Related Art

With the increasing speed and compactness of computer systems has come a demand for magnetic disk apparatuses with higher speeds and higher densities. For this reason, because the frequency of the signals handled by the decoding circuit of the magnetic disk apparatus increases, and the recording density on the magnetic medium increases, there is a deterioration in quality. Therefore, it is desirable to have a decoding circuit for a magnetic recording and reading apparatus which is capable of performing very reliable decoding of a low-quality signal.

In a magnetic recording and reading apparatus, one proposed means of performing reliable decoding of a playback signal, the quality of which has deteriorated, is called a PRML (partial response maximum likelihood) decoding circuit, in which a partial response detector section and a maximum likelihood detector section are combined.

The technology in this PRML decoding circuit is classified according to form of the partial equalization used, there being PR4ML, EPR4ML (extended PR4ML), and EEPR4ML systems.

These PRML decoding systems, in comparison with the methods of the past in which the peak of the playback signal was detected, offer the same approximate error rate even when the signal S/N ratio is low. Additionally, EPR4ML is more effective for high-density recording than PR4ML, and EEPR4ML is more effective for high-density recording than EPR4ML.

However, there is a problem in that in the EPR4ML system, which is effective for high-density recording, the more E's there are, the more difficult the high-speed operation becomes from the standpoint of power consumption.

For decoding a playback signal which has been recorded at high density onto a magnetic disk, a fixed-delay tree search/decision feedback (FDTS/DF) decoder has been proposed, this decoder using a tree search in the decision section to provide almost the same level of performance as the above-noted PRML system. For example, a FDTS/DF decoder is proposed by Jaekyun Moon and L. Richard Carley in their publication of "Perfomance Comparison of Detecting Methods in Magnetic Recording" (IEEE Trans. on Magnetics, Vol. 26, No. 61, pp. 3155–3172, November 1990).

In magnetic recording and reading systems in the past, a plurality of annular tracks are formed on a magnetic disk, with data being written onto these tracks. A heading performs writing of data onto these tracks and playback of data from these tracks. The head is connected to a head IC, which has a servo circuit which performs positioning of the head over the magnetic disk and which has a write circuit for writing data and an amplifier which amplifies the read out data signal. The head IC has connected to it a read/write circuit which handles track information, zone information, and head information. The operation of the servo circuit and the read/write circuit is controlled by a control circuit. The control circuit performs data transfer with an external apparatus via an interface circuit (using an SCSI interface when the external apparatus is a personal computer).

A decoding circuit used in a magnetic recording and reading system of the past was connected to the output of a means for amplifying an analog signal, and included a variable-gain amplifier, a level detector, a variable-frequency oscillator (VFO), a pre-equalizer, and an equalizer. In the decoding circuit of this magnetic recording and reading system, the output of the pre-equalizer is input to the level detector, the VFO, and the equalizer. The output of the pre-equalizer is fed back to the variable-gain amplifier by means of the level detector, and is also input to the VFO for generation of the system clock. The equalizer is formed by a subtractor, a tree-search type decoder, and a feedback equalizer, and has a clock supplied to it which is generated by the VFO.

In this decoding system, in contrast to the PRML system, to enable free selection of the target equalization waveform, it is possible to design the transfer function of the equalizer in a manner that is advantageous with respect to such factors as input signal S/N ratio and resolution. Because the algorithm in the decision section is simple, an advantage in operating speed is provided in comparison with the PRML system.

However, in a decoder circuit used in a magnetic recording and reading apparatus of the past, while it is possible to make arbitrary setting of the target equalization waveform, it presents problems because, in this method, there is no gain-control method which uses an AGC loop and no clock-extraction method which uses a PLL loop, and also because gain control and clock extraction with respect to the arbitrary target equalization waveform are extremely difficult.

In addition, because the operating speed of a detection section which uses a tree search type feedback decoder depends upon the system clock, there is a problem in that the processing time must be completed within one cycle of the system clock, thereby making high-speed operation difficult.

SUMMARY OF THE INVENTION

An object of the present invention is to provide a decoding circuit for a magnetic recording and reading system which, by means of a combination of PR4 equalizations in a fixed-delay tree search/decision feedback (FDTS/DF) decoder, enables a relatively simple AGC loop implementation and easy clock extraction, even in a fixed-delay tree search/decision feedback decoding system dealing with an arbitrary equalization waveform. Another object of the present invention is to increase the speed of the decoding operation of the decoding circuit of a magnetic recording and reading system by using a PR4 equalization waveform capable of independent processing of even and odd data lines.

To achieve the above-noted objects, in the first form of a decoding circuit for a magnetic recording and reading system of the present invention, to obtain digital information having a value of either 1 or 0 from an analog signal played back from a magnetic recording medium, the decoding circuit is formed by a level-setting system, which pre-sets the signal level to be taken as the value 1, and a detection system. This level-setting system has a variable-gain amplifier, a PR4 equalizer, and a level detector. The variable-gain amplifier has a gain which is variable in response to the signal input from the level detector. The PR4 equalizer is connected to the output of the variable-gain amplifier, and has a transfer function for the purpose of performing equalization of an input waveform to a partial response class 4 target equalization waveform. The level detector accepts the output of this PR4 equalizer as an input signal, the output signal being fed back to the variable-gain amplifier as an AGC loop control signal, for the purpose of controlling the gain of the variable-gain amplifier. The detection system is formed by a VFO (variable-frequency oscillator) and a decision feedback type decoding means. The VFO is connected to the output of the PR4 equalizer, and generates the system clock. The decision feedback decoding means is connected to the output of the PR4 equalizer and the VFO, and this means decodes the data lines appearing at the output of the PR4 equalizer.

In the second form of a decoding circuit for a magnetic recording and reading system of the present invention, the decision feedback decoding means has following means in addition to the construction of the first form of the decoding circuit: an even-line decoding means for performing decoding of only even data lines, an odd-line decoding means for performing decoding of only odd data lines, and a clock-dividing means for dividing a clock, supplied to these two above-noted means, in half.

While in the above forms of the present invention the signal level to be taken as the level 1 is pre-set in the level-setting system, it is possible instead to implement the present invention by providing a reference level generating system which detects the signal level to be taken as 1 and outputs a reference level signal.

In this case, the reference level generating system is formed by a PR4ML equalizer that has a transfer function for the purpose of performing equalization of an input waveform to a partial response class 4 target equalization waveform, and a level detector which detects the amplitude of the output of the PR4ML equalizer as its input signal and which outputs a reference level signal. The configuration of the detection system is no different between the first form and the second form of the present invention.

According to the first form of the present invention, the PR4 equalization is completed in the variable-gain amplifier an the clock extractor input section. For this reason, it is relatively simple to implement an AGC loop and it is easy to perform clock extraction in a decision feedback type decoding system which handles arbitrary target equalization waveforms. According to the second form of the present invention, by implementing a decision feedback type decoding circuit which uses a tree search so as to enable independent processing of even and odd data lines, it is possible to perform high-speed decoding operations, by virtue of the fact that the operating clock of the decision feedback type decoding circuit which uses a tree search is divided in half, thereby providing a margin in decoding operations.

BRIEF DESCRIPTION OF THE DRAWINGS

The present invention will be more clearly understood form the description as set forth below with reference to the accompanying drawings, wherein.

DESCRIPTION OF THE PREFERRED EMBODIMENT

Before describing the preferred embodiments of the present invention, an explanation will be given of the conventional magnetic recording and reading and reading system shown in FIGS. 1A and 1B.

Figure 1A:
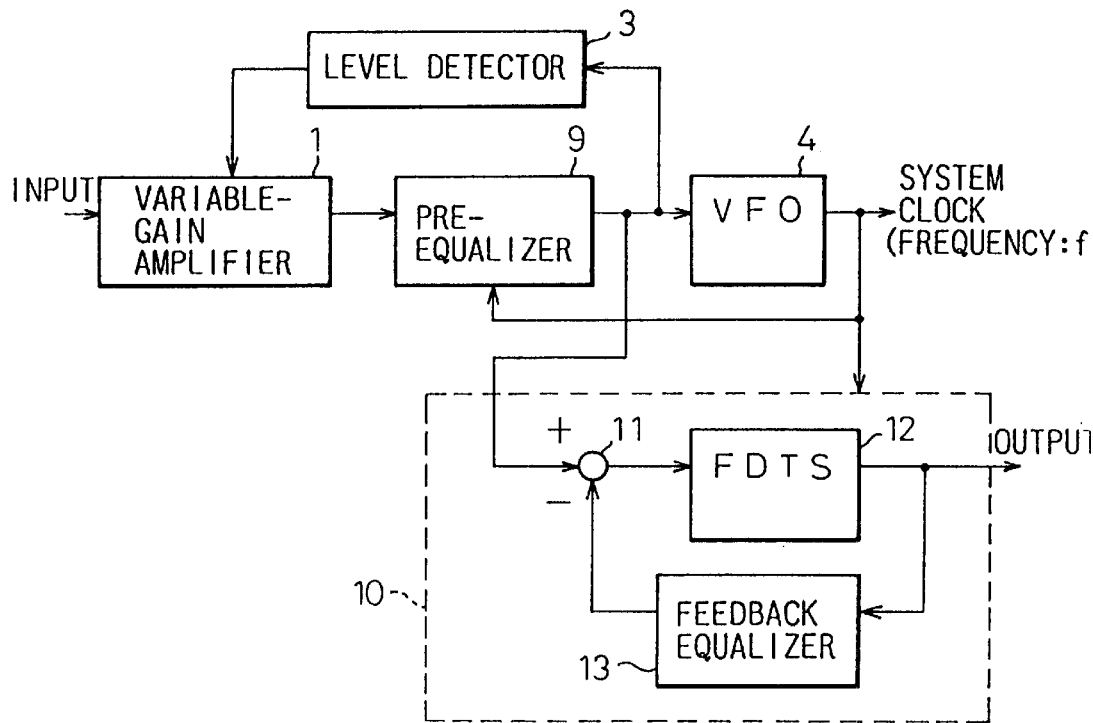
FIG. 1A is a block diagram of a decoding circuit of a prior art magnetic recording and reading system.
Figure 1B:
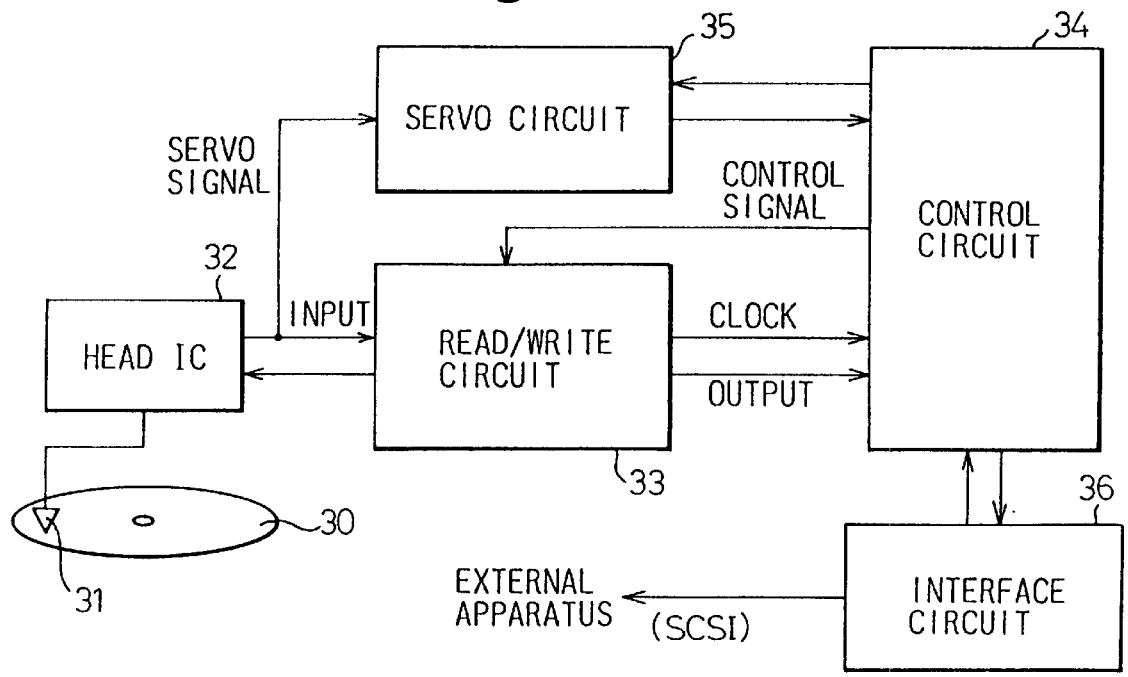
FIG. 1B is a block diagram showing the overall configuration of a magnetic recording and reading system of the past.

FIG. 1B is a block diagram which shows the overall configuration of a magnetic recording and reading system of the past. A plurality of annular tracks are formed on the magnetic disk 30, data being written onto these tracks. A head 31 performs writing of data onto these tracks and reading of data from these tracks, this head being positioned over the magnetic disk 30 by a servo circuit 35. The head 31 is connected to a head IC 32 which has a write circuit for writing data and an amplifier which amplifies a read out data signal. To this head IC 32 is connected a read/write circuit 33 which handles track information, zone information, and head information. The operation of this servo circuit 35 and the read/write circuit 33 is controlled by a control circuit 34. The control circuit 34 performs data transfer with an external apparatus via an interface circuit 36 (using an SCSI interface when the external apparatus is a personal computer).

FIG. 1A shows an example of the configuration of a decoding circuit used in a magnetic recording and reading system of the past configured as described above. This decoding circuit is connected to the output of a means for amplifying an analog signal, and has a variable-gain amplifier 1, a level detector 3, a variable-frequency oscillator (VFO) 4, a pre-equalizer 9, and an equalizer 10. In this decoding circuit of a magnetic recording and reading system, the output of the pre-equalizer 9 is input to the level detector 3, the VFO 4, and the equalizer 10. The output of the pre-equalizer 9 is fed back to the variable-gain amplifier 1 by means of the level detector 3, and is input to the VFO 4 so as to generate a system clock. The equalizer 10 is formed by a subtractor 11, a tree-search type decoder 12, and a feedback equalizer 13, and is fed the system clock which is generated by the VFO 4.

In this decoding system, in contrast to the PRML system, to enable free selection the target equalization waveform, it is possible to design the transfer function of the equalizer in a manner that is advantageous with respect to such factors as input signal S/N ratio and resolution. Because the algorithm in the decision section is simple, an advantage in operating speed is provided in comparison with the PRML system.

However, in a decoder circuit used in a magnetic recording and reading apparatus of the past as shown in FIG. 1B, while it is possible to make arbitrary setting of the target equalization waveform, it presents problems because, in this method, there is no gain-control method which uses and AGC loop and no clock-extraction method which uses a PLL loop. Also, in a decoder circuit used in a magnetic recording and reading apparatus of the past, as shown in FIG. 1B, both gain control and clock extraction with respect to the arbitrary target equalization waveform are extremely difficult.

In addition, because the operating speed of a detection section which uses a tree-search type feedback decoder depends upon the system clock, there is a problem in that the processing time must be completed within one cycle of the system clock, thereby making high-speed operation difficult.

Figure 2:
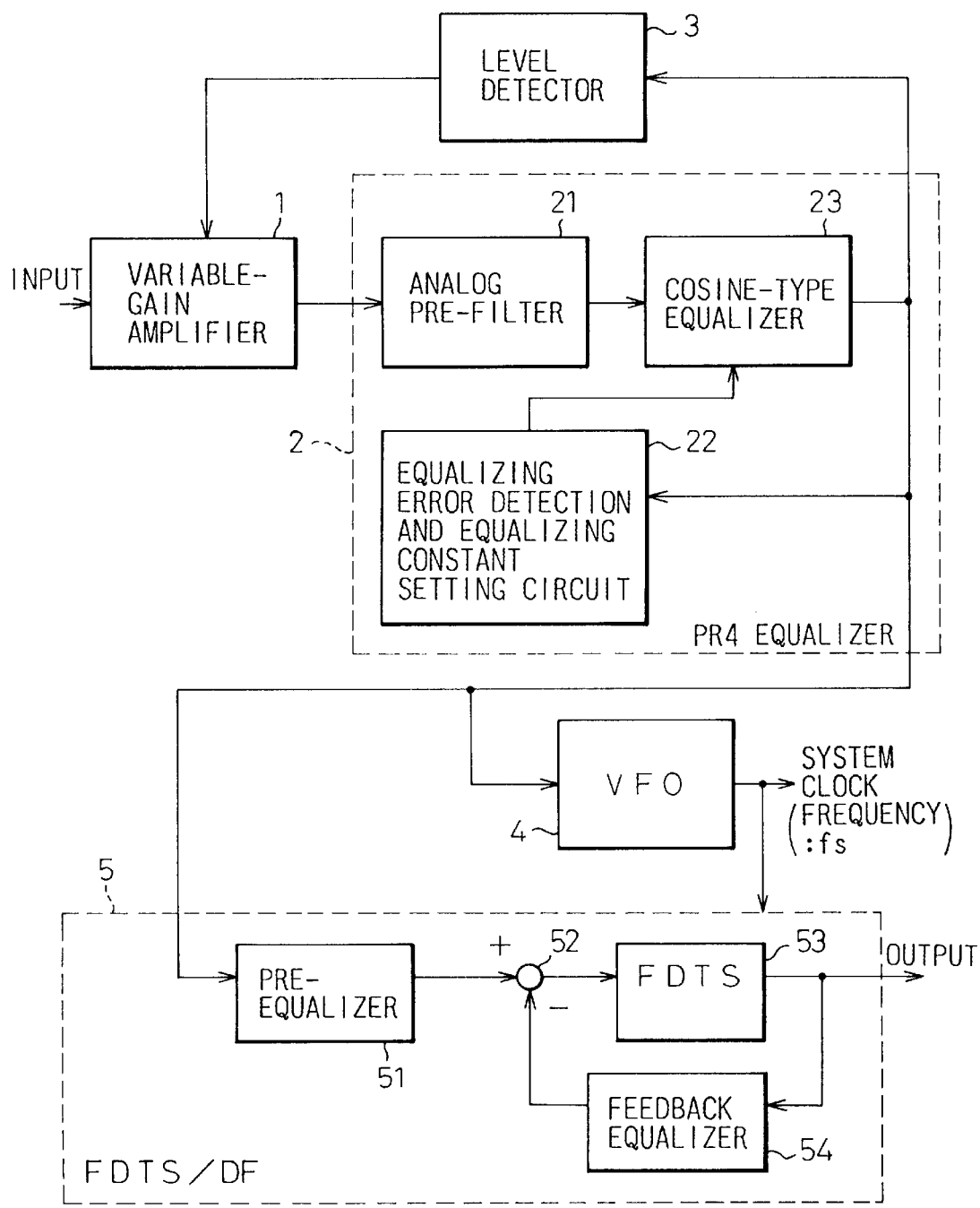
FIG. 2 is a block diagram of the first embodiment of the present invention.

FIG. 2 is a block diagram which shows the first embodiment of a configuration of a decoding circuit for a magnetic recording and reading system according to the present invention, this drawing showing the configuration within the read/write circuit 33 described with regard to FIG. 1B. Therefore, as shown in FIG. 1B, the first stage of the decoding circuit has a magnetic recording medium, such as the magnetic disk 30, a head 31 which acts as a transducer, and a head IC 32. The information which is recorded as magnetizations of the magnetic disk 30 is extracted as an electrical signal by the head 31, which is an MR head or the like, and after this is amplified by a head amplifier which is within the head IC 32 provided in the vicinity of the head, it is input as the playback signal to this decoding circuit.

The decoding circuit has an AGC (automatic gain control circuit) loop which is formed by a variable-gain amplifier (GCA) 1 for the purpose of attaining a constant signal amplitude, an equalizer 2, and a level detector 3. The signal amplitude at the input section of the level detector 3 is maintained constant at all times, by adjustment to suit the head-medium combination, the magnetic disk tangential speed, and temperature variation of the gains of the various amplification stages. In the last stage of this AGC loop, there is a variable-frequency oscillator (hereinafter referred to as a VFO) 4, and a fixed-delay tree search/decision feedback decoder (hereinafter referred to as a FDTS/DF) 5. In the first embodiment, a transfer function for PR4 equalization is used as the transfer function of the equalizer 2 within the AGC loop, thereby making the equalizer 2 a PR4 equalizer.

The PR4 equalizer 2 is formed, in this embodiment, by an analog pre-filter 21 and a self-adaptive type of cosine-type equalizer 23. The output of the cosine-type equalizer 23 is fed back to the cosine equalizer 23 via a equalizing error detection and equalizing constant setting circuit 22. The self-adaptive cosine-type equalizer 23 operates so that the difference between its output and the PR4 target waveform is minimum.

The FDTS/DF decoder 5 has a pre-equalizer (forward equalizer) 51, a subtractor 52, an FDTS (tree section) 53, and a feedback equalizer 54. The output of the FDTS 53 is fed back to the subtractor via the feedback equalizer 54, and is subtracted from the output of the pre-equalizer 51.

In a decoding circuit for a magnetic recording and reading system configured as described above, at the variable-gain amplifier 1, with regard to the input playback signal, the amplitude of the sampling point corresponding to a binary data value of 1 is held constant by means of amplitude information from the last stage level detector, this being input to the PR4 equalizer 2.

Next, the signal which is equalized by the PR4 equalizer, which comprises the analog pre-filter 21, the cosine-type equalizer 23, and the equalizing error detection and equalizing constant setting section 22, is input to the level detector 3, to the VFO 4 for the purpose of clock extraction, and to the FDTS/DF 5.

Figure 3:
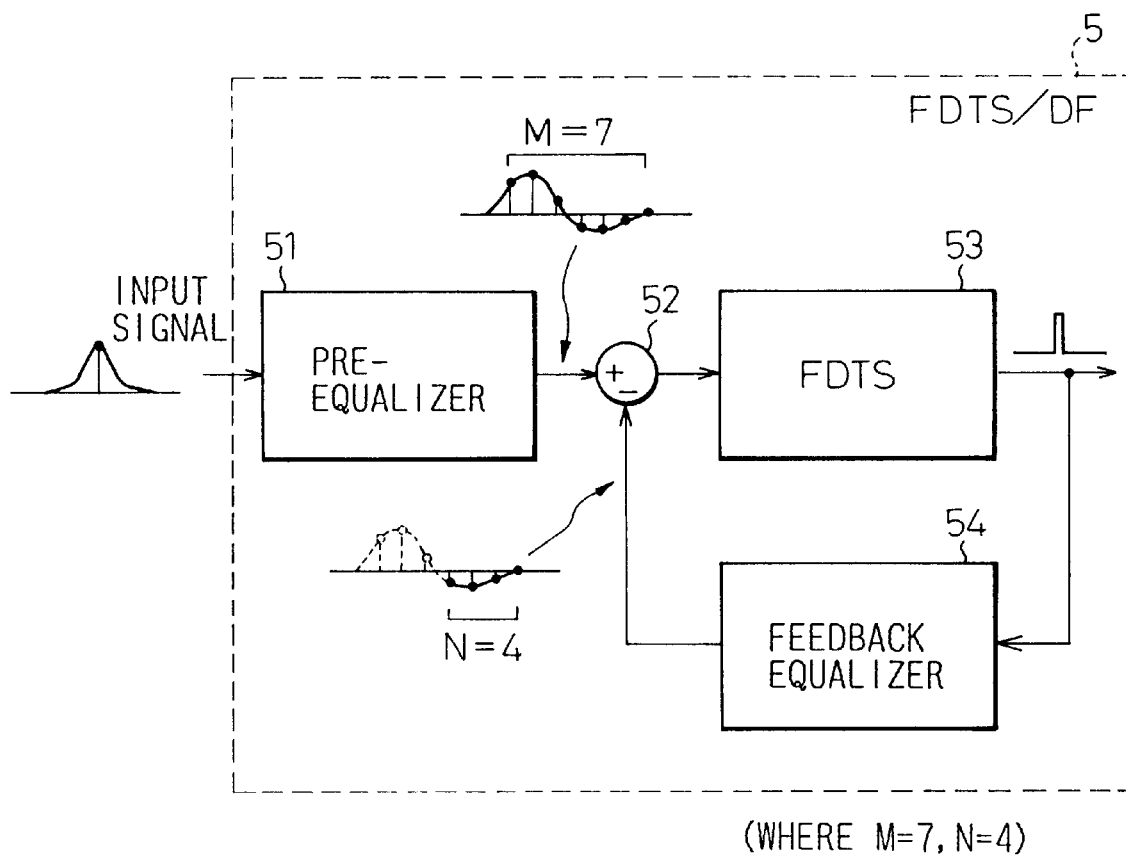
FIG. 3 is a drawing which shows the input-output characteristics of an FDTS/DF.

The input-output characteristics of this FDTS/DF 5 are shown in FIG. 3. In this example, when one sample corresponding to a binary value of 1 of the line of sampled points (data line) of the signal waveform which is PR4 equalized is input to the pre-equalizer 51, it is possible for the pre-equalizer 51 can set the amplitude of M sampled points (where M is an integer 3 or larger). The N-th sampled point (where N is a positive integer such that M>N) from the end of the sampled line of M points set by the pre-equalizer is output from the feedback equalizer 54.

By inputting a sampling of the line of sampled points (data line) of the signal waveform which is PR4 equalized and which corresponds to a binary value of 1 to the pre-equalizer 51, the pre-equalizer 51 outputs a sampled line formed by 7 samples. In doing this, if a binary value of 1 output from the FDTS tree section 53 is input to the feedback equalizer 54, a sampled line formed by 4 samples is output from the feedback equalizer 54. This sample line of 4 samples is input to the subtractor 52, where it is subtracted from the output sample line of the above-described pre-equalizer 51. The equalizing constants of the pre-equalizer 51 and the feedback equalizer 54 are mutually set so that the sample line of 4 samples from the feedback equalizer 54 have the same amplitudes as the last 4 samples of the sample line from the pre-equalizer.

Of course, it is possible for the constant of one to be fixed, and the equalizing constants of the other to be set so as to satisfy the above-noted condition. Within the FDTS/DF 5, the signal waveform after PR4 equalization by the pre-equalizer 51 is equalized, and it is possible to set the transfer function up to and including the FDTS tree section 53 so as to be advantageous with regard to input signal S/N ratio, resolution, and the like.

Furthermore, in the above-described embodiment, because the signal waveform at the input section of the level detector 3 is the same as the PR4 equalized waveform, it is possible to use the same technology with regard to the level detector 3 or last stage clock extractor (VFO 4) as in previous PR4 equalization systems.

According to this first embodiment of a configuration of a decoding circuit for a magnetic recording and reading system according to the present invention, at the variable-gain amplifier and input section of the VFO 4, which is a clock extractor, the PR4 equalization is completed by means of the PR4 equalizer 2. For this reason, it is possible to implement an AGC loop with a relatively simple configuration and it is easy to perform clock extraction, even in a decoding circuit for a magnetic recording and reading system which handles arbitrary equalization waveforms.

Figure 4:
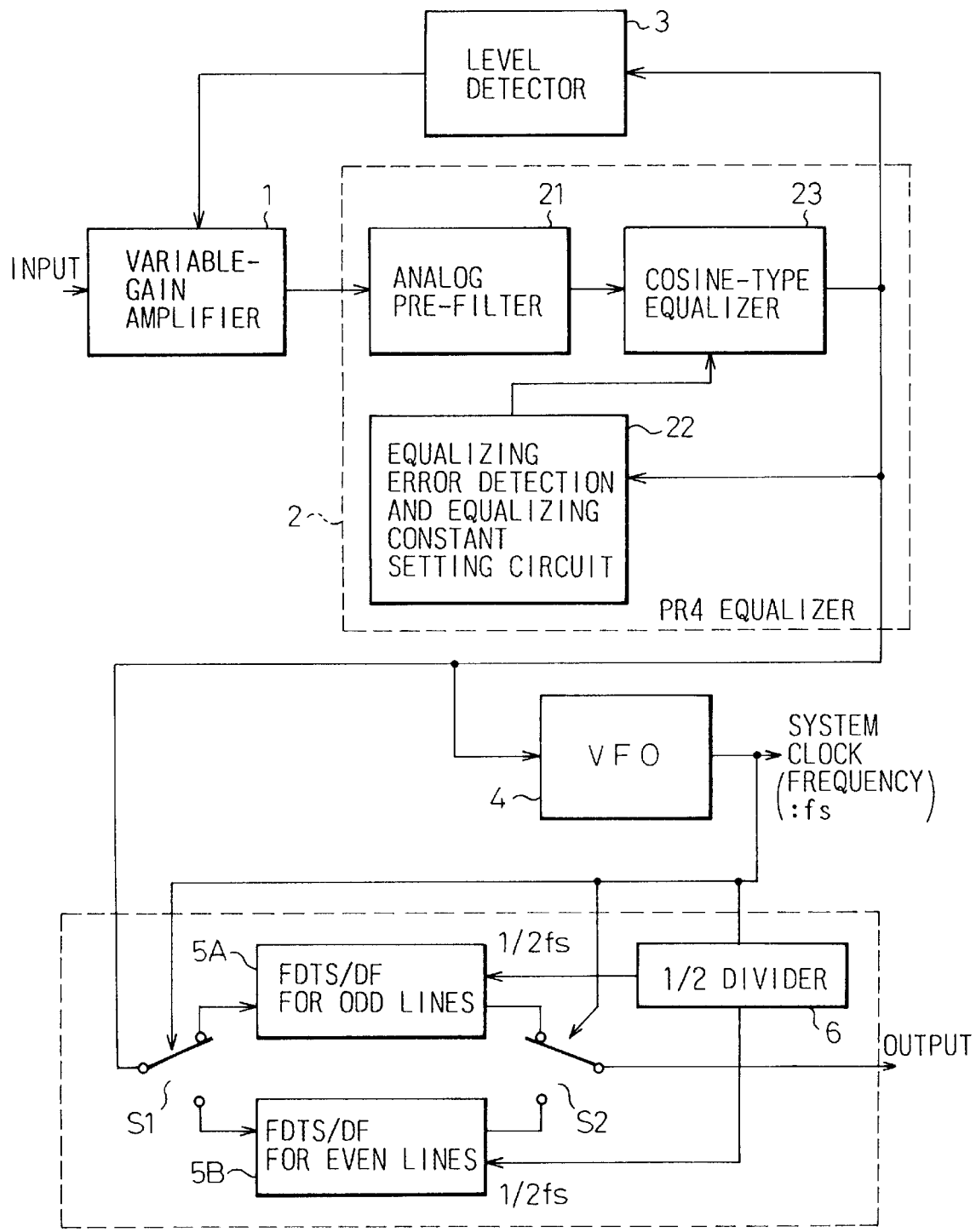
FIG. 4 is a block diagram of the second embodiment of the present invention.

FIG. 4 is a block diagram which shows the configuration of the second embodiment of a decoding circuit for a magnetic recording and reading system according to the present invention, this differing from the first embodiment of a configuration of a decoding circuit for a magnetic recording and reading system as shown in FIG. 2 only with respect to the configuration of the FDTS/DF 5. Therefore, elements which correspond to elements in FIG. 2 are assigned the same reference numerals in FIG. 4, and will not be described herein.

In the second embodiment, the FDTS/DF 5 is formed by two separate FDTS/DFs: an FDTS/DF for odd lines 5A, which handles odd lines of the data line after PR4 equalization, and an FDTS/DF for even lines 5B, which handles even lines of the data line after PR4 equalization. The FDTS/DF for odd lines 5A, and the FDTS/DF for even lines 5B are disposed in parallel, switches S1 and S2 being provided at the inputs and outputs thereof for the purpose of having only one of the FDTS/DF for odd lines 5A and the FDTS/DF for even lines 5B operate. The results of independent decoding of even lines and odd lines are output as a later-synthesized decoded output at a part which is not shown in the drawing.

In the second embodiment, the FDTS/DF for odd lines 5A and the FDTS/DF for even lines 5B have input to them the system clock fs output from the VFO 4, after it is divided in half.

In this second embodiment, one sample corresponding to a binary value of 1 of either an odd line or an even line of the sampled point line (data line) of the PR4 equalized signal waveform shown in FIG. 3 as being input to the FDTS/DF 5. The sample is input to the pre-equalizer 51, from which is output a sample line of 7 samples. In doing this, when the binary value 1, which is the output of the FDTS/DF 53, is input to the feedback equalizer 54, a sample line of 4 samples corresponding to the binary value 1 is output from the feedback equalizer 54, the sample line being subtracted at the subtractor 52 from the output sample line from the pre-equalizer 52. The equalizing constants of the pre-equalizer 51 and the feedback equalizer 54 are mutually set so that 4 samples of the line output from the feedback equalizer 54 have the same amplitudes as the last 4 samples of the sample line from the pre-equalizer 51. In the second embodiment as well, it is possible for the constants of one to be fixed, and the equalizing constants of the other to be set so as to satisfy the above-noted condition. Within the FDTS/DF 5A and FDTS/DF 5B, the signal waveform after PR4 equalization by the pre-equalizer 51 is equalized, and it is possible to set the transfer function up to and including the FDTS tree section 53 so as to be advantageous with regard to input signal S/N ratio, resolution, and the like.

In this second embodiment, it is possible to take advantage of the characteristic of being able to independently process the even lines and odd lines of the signal data line, which is one of the advantages of the PR4 equalization system. In addition, by providing the FDTS/DF 5 in a manner which enables independent processing of even and odd lines of data, the operating clock of a fixed-delay tree search/decision feedback decoder becomes ½ of the system clock fs, thereby providing an operating margin which enables high-speed decoding operation.

Figure 5:
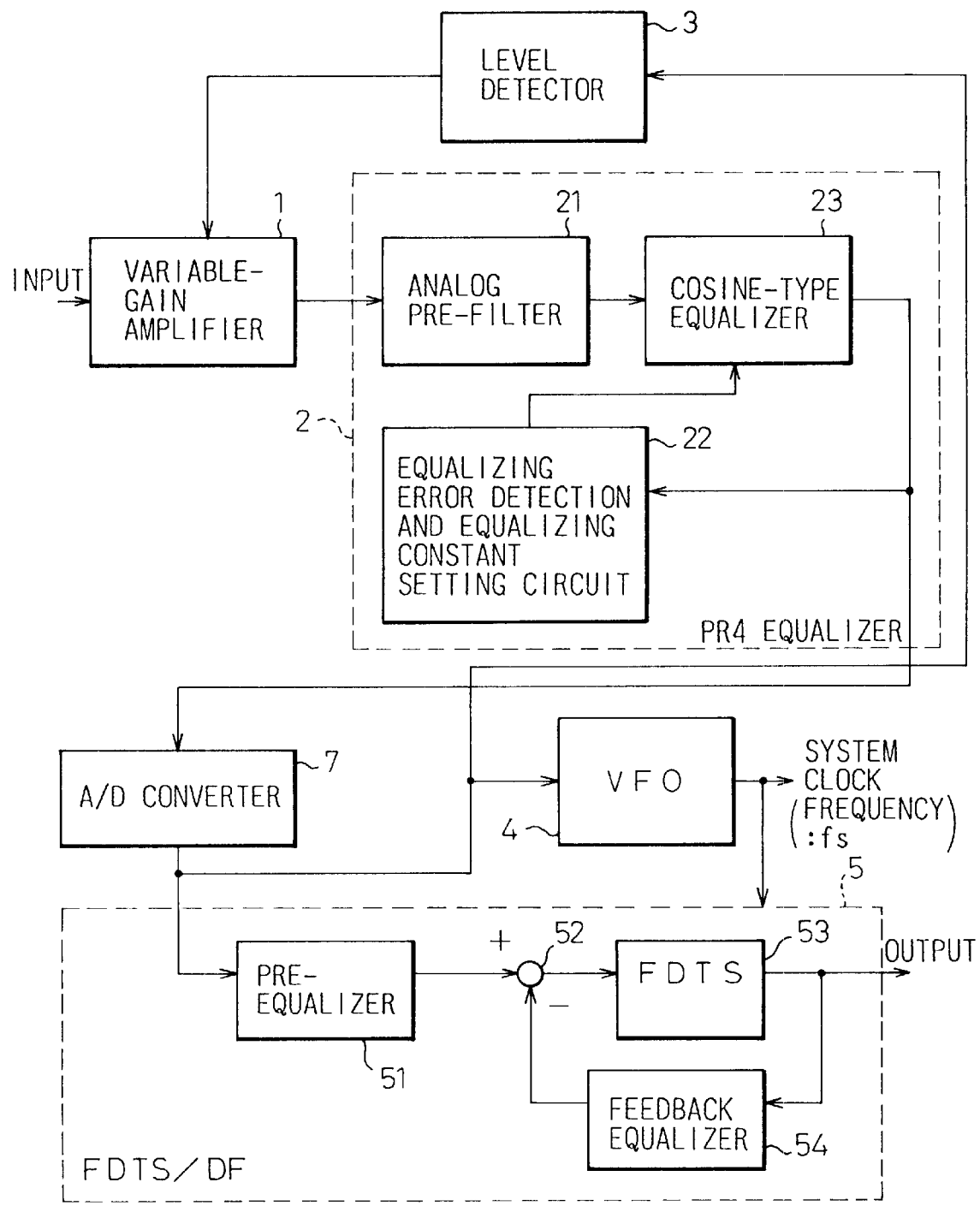
FIG. 5 is a block diagram of the third embodiment of the present invention.
Figure 6:
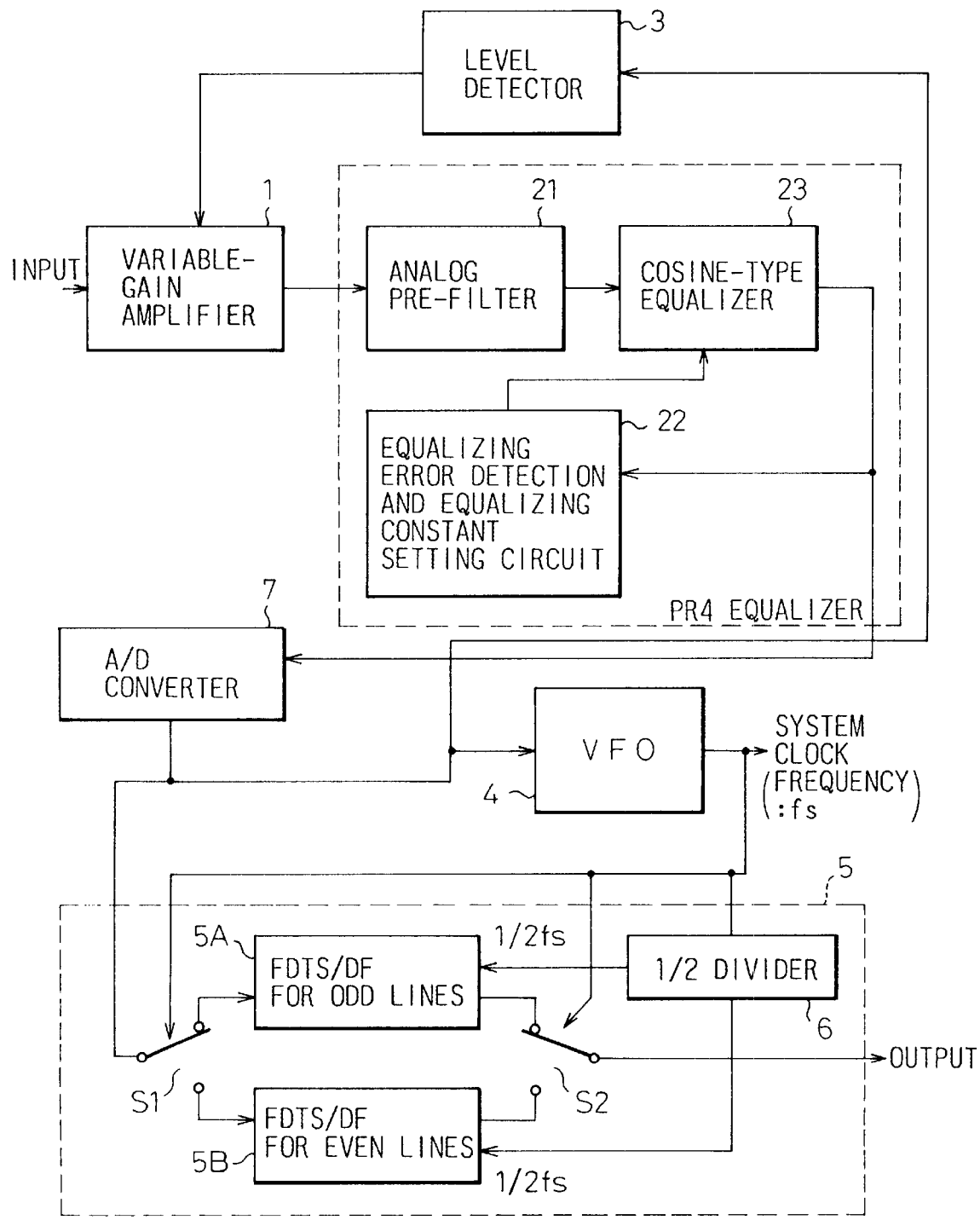
FIG. 6 is a block diagram of the fourth embodiment of the present invention.

FIG. 5 is a block diagram of the configuration of the third embodiment of a decoding circuit for a magnetic recording and reading system according to the present invention, this differing from the first embodiment of a configuration of a decoding circuit for a magnetic recording and reading system as shown in FIG. 2 only with respect to the addition of an A/D converter 7. FIG. 6 is a block diagram the configuration of the fourth embodiment of a decoding circuit for a magnetic recording and reading system according to the present invention, this differing from the second embodiment of a configuration of a decoding circuit for a magnetic recording and reading system as shown in FIG. 4 only with respect to the addition of an A/D converter 7. Therefore, elements which correspond to elements already described are assigned the same reference numerals, and will not be described herein.

In the decoding circuit for a magnetic recording and reading system of the third and fourth embodiments of the present invention, when a playback signal corresponding to an input binary value of 1 is input to the variable-gain amplifier 1, this amplifier adjusts the amplitude thereof so as to be constant, the result being input to the PR4 equalizer 2. The amplitude of the sampled point is established by the amplitude information from the level detector 3. At the PR4 equalizer 2, the output of this circuit is adjusted by means of the analog pre-filter 21, the equalizing error detection and equalizing constant setting circuit 22, and the self-adaptive cosine-type equalizer 23, so its error difference with respect to the target PR4 waveform is a minimum.

In the third and fourth embodiments, the output signal which is equalized by the PR4 equalizer 2 is converted from an analog signal to a digital signal by the A/D converter 7, after which it is input to the level detector 3, to the VFO 4 for the purpose of clock extraction, and to the FDTS/DF 5. In the third and fourth embodiments, in the circuitry beyond the A/D converter 7, all processing is performed digitally.

In the FDTS/DF 5 in the third embodiment, similar to the first embodiment, the data line after the PR4 equalization is treated as one data line, whereas in the fourth embodiment, similar to the second embodiment, there are two FDTS/DFs, 5A and 5B, which independently handle the odd and even lines of the data line after PR4 equalization.

Figure 7:
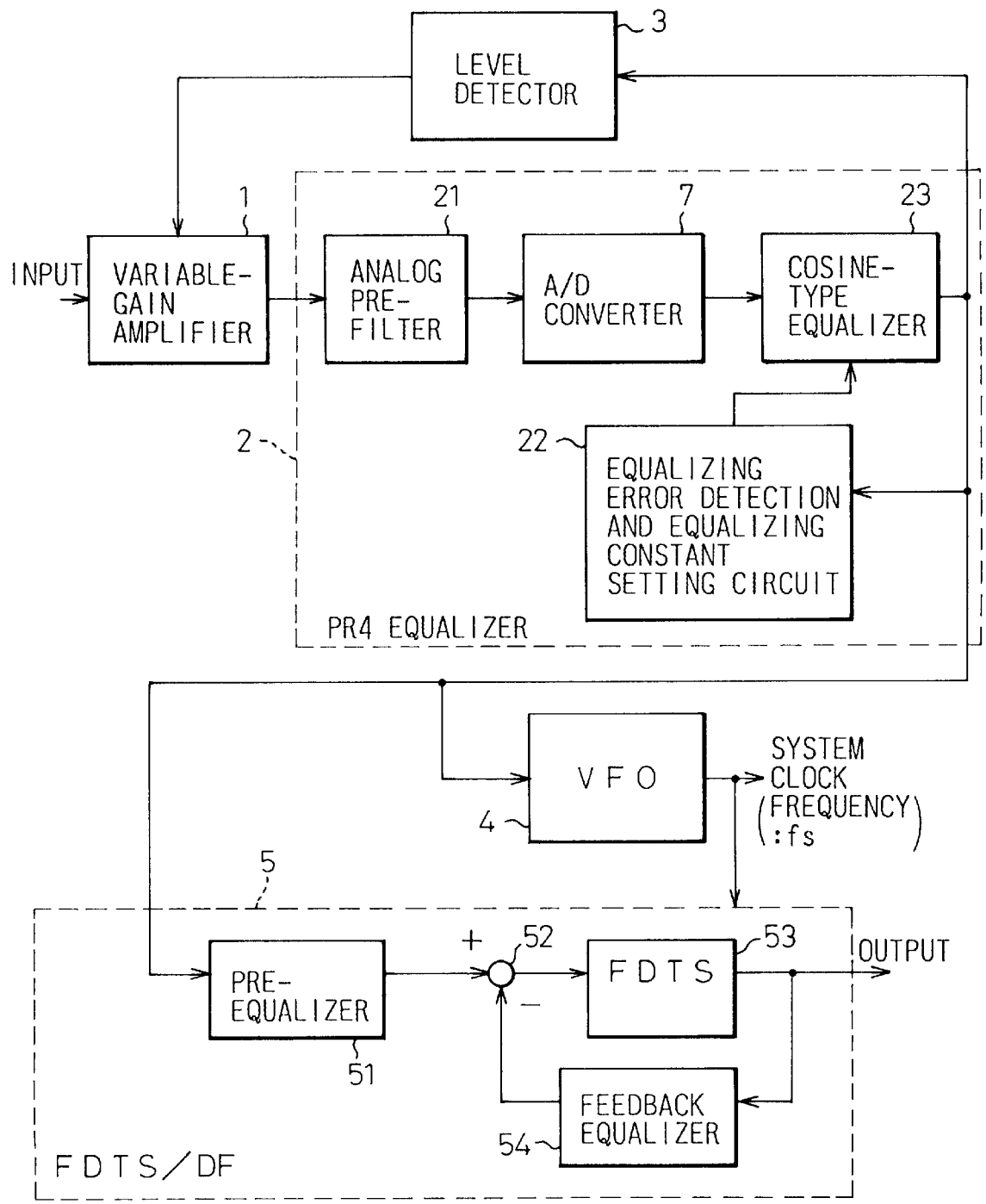
FIG. 7 is a block diagram of the fifth embodiment of the present invention.
Figure 8:
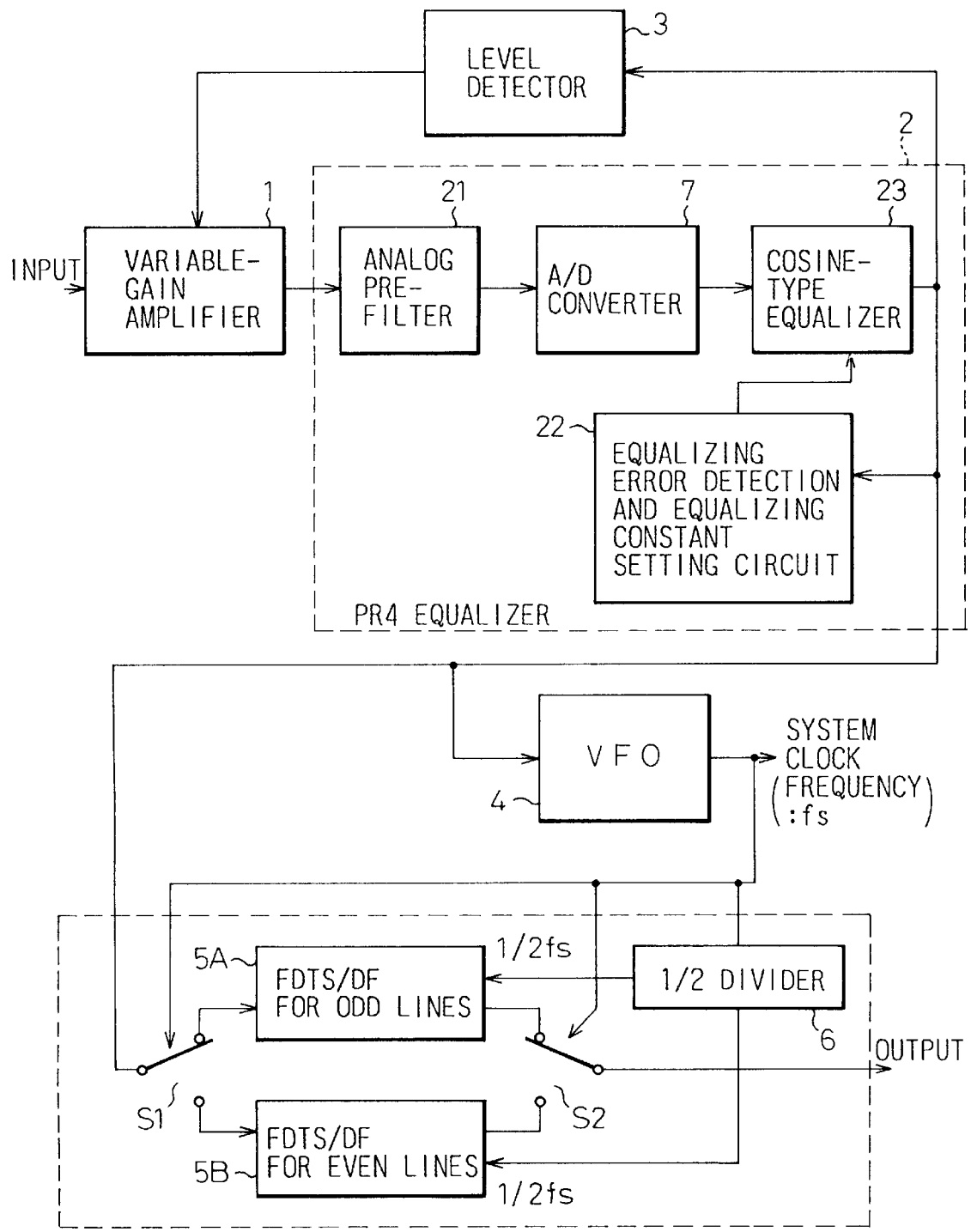
FIG. 8 is a block diagram of the sixth embodiment of the present invention.

FIG. 7 is a block diagram the configuration of the fifth embodiment of a decoding circuit for a magnetic recording and reading system according to the present invention, this differing from the first embodiment of a configuration of a decoding circuit for a magnetic recording and reading system as shown in FIG. 2 only with respect to the addition of an A/D converter 7 within the PR4 equalizer 2. FIG. 8 is a block diagram the configuration of the sixth embodiment of a decoding circuit for a magnetic recording and reading system according to the present invention, this differing from the second embodiment of a configuration of a decoding circuit for a magnetic recording and reading system as shown in FIG. 4 with respect to the addition of A/D converter 7 within the PR4 equalizer 2. Therefore, elements which correspond to elements already described are assigned the same reference numerals, and will not be described herein.

In the fifth and sixth embodiments, the amplitude of the sampling point corresponding to a binary data value of 1 is held constant by means of amplitude information from the level detector 3, this being input to the PR4 equalizer 2. In the fifth and sixth embodiments, the PR4 equalizer 2 is formed by an analog pre-filter 21, an A/D converter 7 which converts this output signal thereof to a digital signal, an equalizing error detection and equalizing constant setting circuit 22, and the self-adaptive cosine-type equalizer 23. In the fifth and sixth embodiments, all processing beyond the A/D converter 7 is performed digitally. The self-adaptive cosine-type equalizer 23 operates so that the difference between its output and the PR4 target waveform is minimum. The signal equalized by the PR4 equalizer configured in the above-described manner is input to the level detector 3, the VFO 4 for the purpose of clock extraction, and the FDTS/DF 5.

In the fifth embodiment, in the FDTS/DF 5, similar to the case of the first embodiment, the data line after the PR4 equalization is treated as one data line, whereas in the fourth embodiment, similar to the sixth embodiment, there are two FDTS/DFs, 5A and 5B, which independently handle the odd and even lines of the data line after PR4 equalization.

Figure 9:
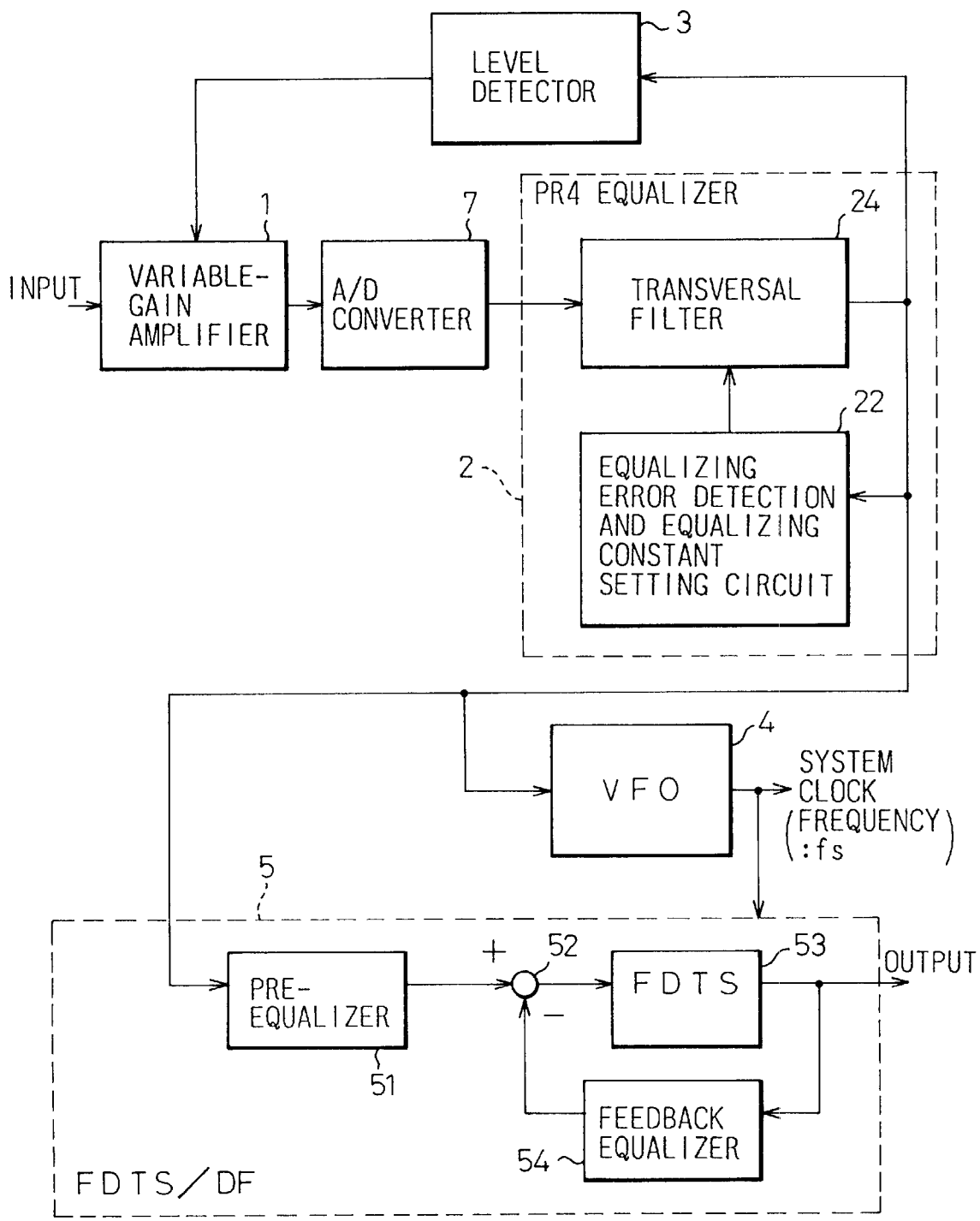
FIG. 9 is a block diagram of the seventh embodiment of the present invention.
Figure 10:
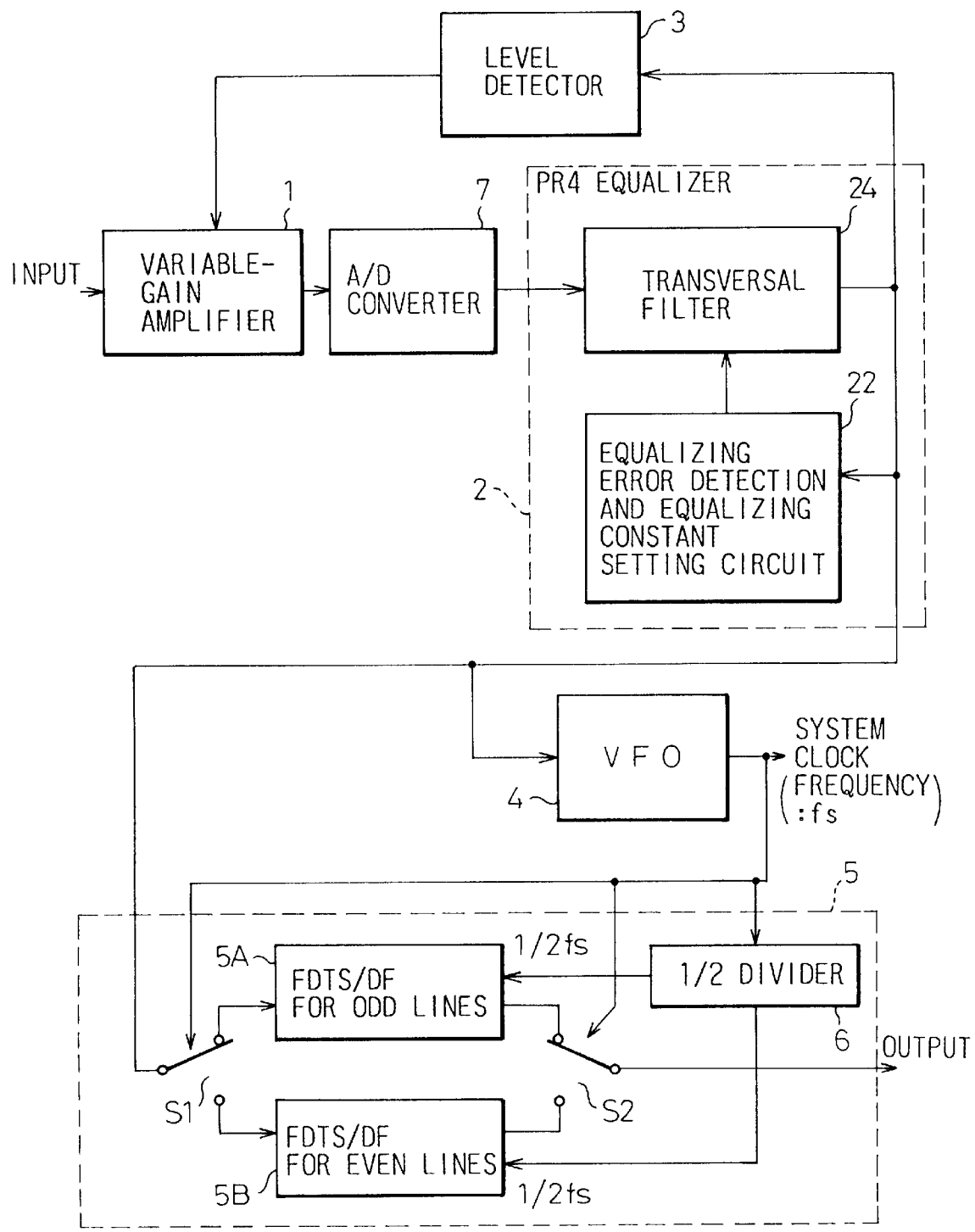
FIG. 10 is a block diagram of the eight embodiment of the present invention.

FIG. 9 is a block diagram the configuration of the seventh embodiment of a decoding circuit for a magnetic recording and reading system according to the present invention, this differing from the first embodiment of a configuration of a decoding circuit for a magnetic recording and reading system as shown in FIG. 2 only with respect to the addition of an A/D converter 7 at the input end of the PR4 equalizer 2, and with respect to the internal configuration of the PR4 equalizer 2 which accompanies the addition of this A/D converter 7. FIG. 10 is a block diagram of the configuration of the eighth embodiment of a decoding circuit for a magnetic recording and reading system according to the present invention, this differing from the second embodiment of a configuration of a decoding circuit for a magnetic recording and reading system as shown in FIG. 4 only with respect to the addition of an A/D converter 7 to the input end of the PR4 equalizer 2, and with respect to the internal configuration of the PR4 equalizer 2 which accompanies the addition of this A/D converter 7. Therefore, elements which correspond to elements already described are assigned the same reference numerals, and will not be described herein.

In the seventh and eight embodiments, when a playback signal corresponding to an input binary value of 1 is input to the variable-gain amplifier 1, this amplifier adjusts the amplitude thereof so as to be constant. The output of the variable-gain amplifier 1 is converted to digital form by the A/D converter 7 and then input to the PR4 equalizer 2.

In the seventh and eight embodiments, because a digitally converted signal is input to the PR4 equalizer 2, there is no analog pre-filter provided, there being provided a self-adaptive type of digital equalizer such as a transversal filter 24, and an equalizing error detection and equalizing constant setting circuit 22. The transversal filter 24 operates so that the difference between the output thereof and the PR4 target waveform is a minimum.

A signal equalized by a PR4 equalizer 2 configured as described above is input to the level detector 3, the VFO 4 for the purpose of clock extraction, and the FDTS/DF 5. In the seventh embodiment, similar to the case of the first embodiment, the data line after PR4 equalization is treated as a single data line, whereas in the eight embodiment, similar to the second embodiment, there are two FDTS/DFs, 5A and 5B, which independently handle the odd and even lines of the data line after PR4 equalization.

In the above-described first through eighth embodiments, in a level-setting system which has an AGC loop formed by the variable-gain amplifier 1, the PR4 equalizer 2, and the level detector 3, the signal level which is to be detected by the detection system as the value 1 is established as a prescribed value, detection being performed in accordance with this established level. It is also possible to generate the signal level corresponding to the value of 1 in the detection system, using a reference level generating system, this reference level being applied as information to the detection system beforehand for the performance of level detection.

FIGS. 11 through 18 show the ninth through the sixteenth embodiments, which use the latter method. With the exception of the part of these embodiments which provides the reference signal level corresponding to the value of 1 in the detection system, they correspond, respectively, to the previously described first through eighth embodiments.

Figure 11:
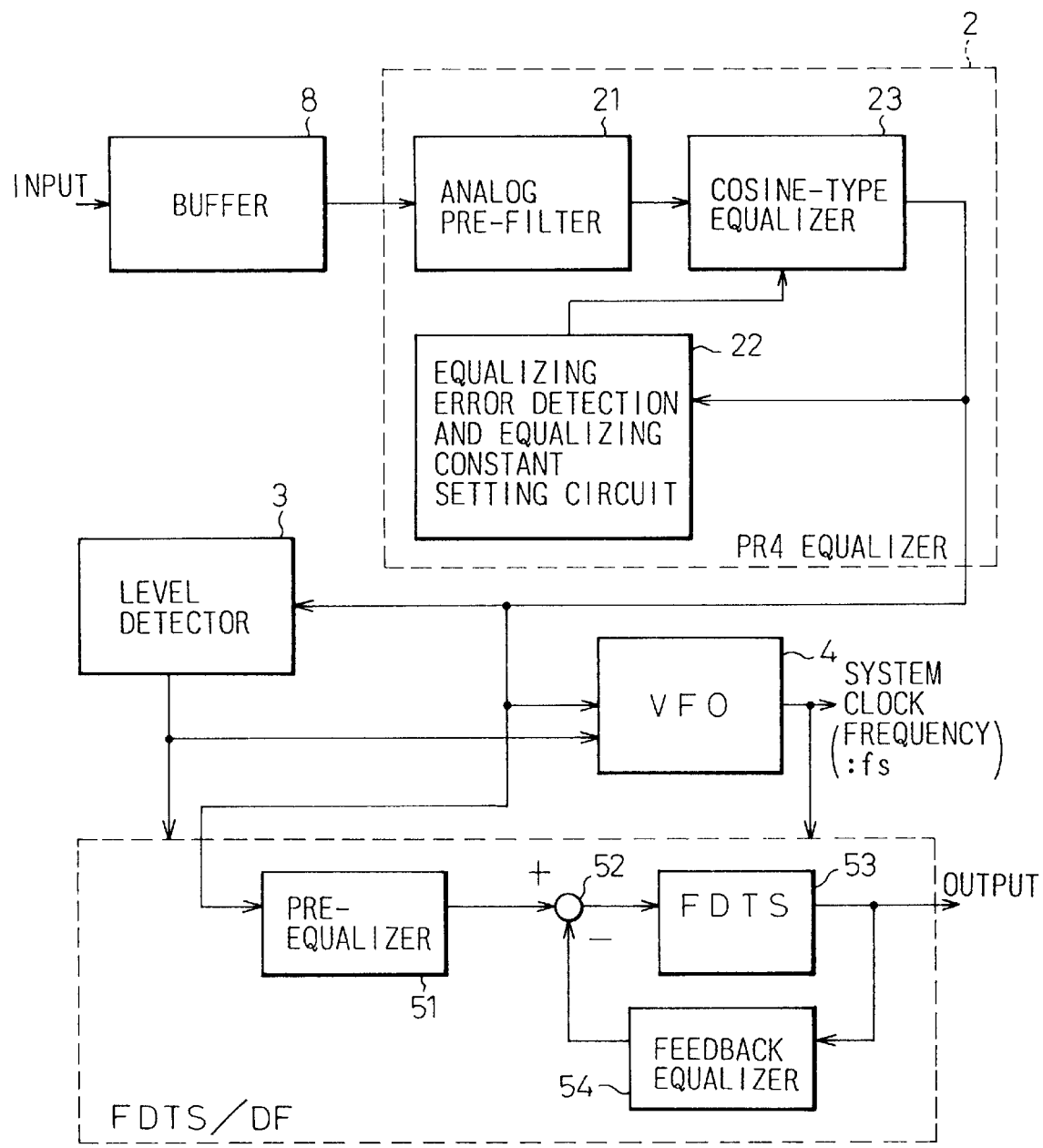
FIG. 11 is a block diagram of the ninth embodiment of the present invention.
Figure 12:
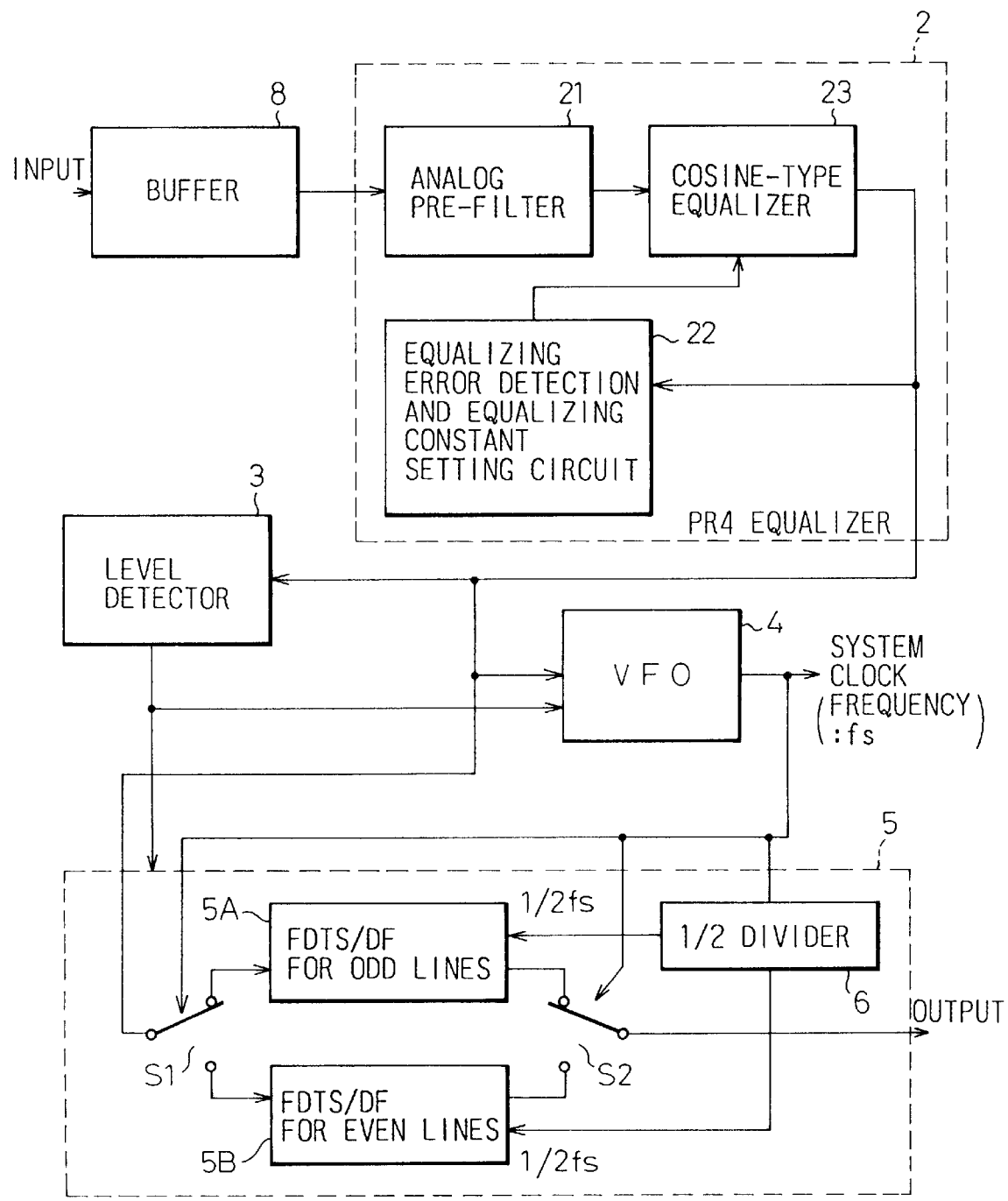
FIG. 12 is a block diagram of the tenth embodiment of the present invention.

FIG. 11 is a block diagram the configuration of the ninth embodiment of a decoding circuit for a magnetic recording and reading system according to the present invention, this embodiment corresponding to the first embodiment of a decoding circuit for a magnetic recording and reading system which is shown in FIG. 2. FIG. 12 is a block diagram the configuration of the tenth embodiment of a decoding circuit for a magnetic recording and reading system according to the present invention, this embodiment corresponding to the second embodiment of a decoding circuit for a magnetic recording and reading system which is shown in FIG. 4. In the ninth and tenth embodiments, the input playback signal passes through a buffer 8 and is input to a PR4 equalizer 2. The configuration of the PR4 equalizer is the same as in the first embodiment, this comprising an analog pre-filter 21, an equalizing error detection and equalizing constant setting circuit 22, and a self-adaptive cosine-type equalizer 23. The operation of the PR4 equalizer is the same as described previously with regard to the first and second embodiments.

The signal which has been equalized by the PR4 equalizer 2 is input to the level detector 3, to the VFO 4 for the purpose of clock extraction, and to the FDTS/DF 5. At the level detector 3, the amplitude of a sampled point which is signal level information corresponding to the binary data value of 1 is detected, this being input to the VFO 4 and the FDTS/DF 5. At the VFO 4 and the FDTS/DF 5, the decoding is performed of the signal from the level detector 3, in accordance with the reference level information.

The FDTS/DF 5 in the ninth embodiment, similar to the first embodiment, treats the data line after PR4 equalization as a single data line, whereas in the tenth embodiment, similar to the second embodiment, there are two FDTS/DFs, 5A and 5B, which independently handle the odd and even lines of the data line after PR4 equalization.

Figure 13:
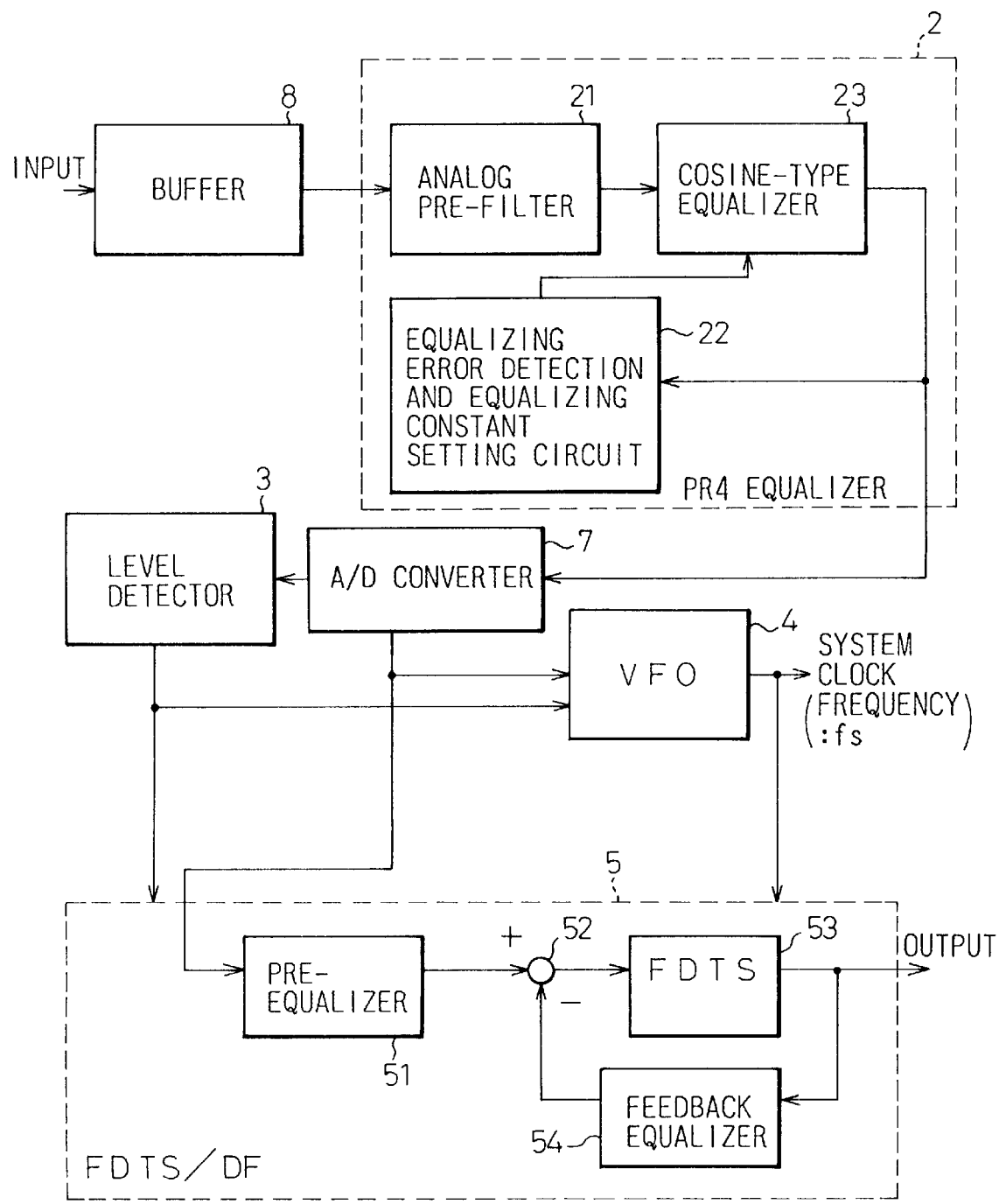
FIG. 13 is a block diagram of the eleventh embodiment of the present invention.
Figure 14:
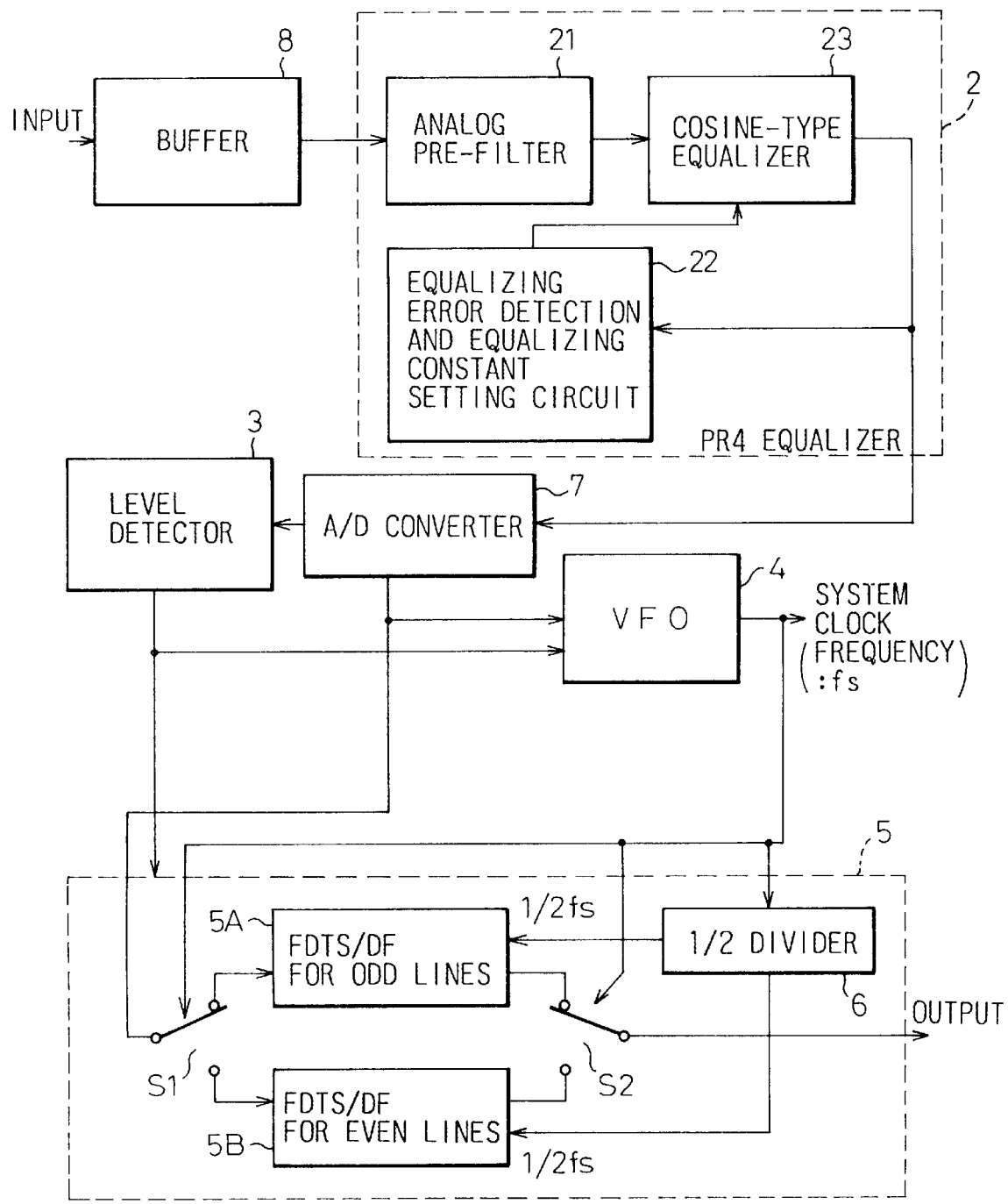
FIG. 14 is a block diagram of the twelfth embodiment of the present invention.

FIG. 13 is a block diagram the configuration of the eleventh embodiment of a decoding circuit for a magnetic recording and reading system according to the present invention, this embodiment differing from the ninth embodiment of a decoding circuit for a magnetic recording and reading system which is shown in FIG. 11 only with respect to the addition of an A/D converter 7. FIG. 14 is a block diagram the configuration of the twelfth embodiment of a decoding circuit for a magnetic recording and reading system according to the present invention, this embodiment differing from the tenth embodiment of a decoding circuit for a magnetic recording and reading system which is shown in FIG. 12 only with respect to the addition of an A/D converter 7. Therefore, elements which correspond to elements already described are assigned the same reference numerals, and will not be described herein.

In the eleventh and twelfth embodiments of a decoding circuit for a magnetic recording and reading system, the input playback signal is input to a PR4 equalizer 2 via a buffer 8. At the PR4 equalizer 2, the output is adjusted, by means of the analog pre-filter 21, the equalizing error detection and equalizing constant setting circuit 22, and a self-adaptive cosine-type equalizer 23 so that its error difference with respect to the target waveform is a minimum.

In the eleventh and twelfth embodiments, the signal output which has been equalized by the PR4 equalizer 2 is converted from an analog signal to a digital signal by means of the A/D converter 7, after which it is input to the level detector 3, the VFO 4 for the purpose of clock extraction, and the FDTS/DF 5. In the eleventh and twelfth embodiments, all processing beyond the A/D converter 7 is performed digitally. Additionally, in the eleventh and twelfth embodiments, as in the cases of the ninth and tenth embodiments, a general AGC loop is not provided, a sampled point amplitude corresponding to the binary data value of 1 being detected at the level detector 3, this then being input from the level detector 3 to the VFO 4 and the FDTS/DF 5 as a reference level.

The FDTS/DF 5 in the eleventh embodiment, as is the case in the ninth embodiment, treats the data line after PR4 equalization as a single data line, whereas in the twelfth embodiment, similar to the tenth embodiment, there are two FDTS/DFs, 5A and 5B, which independently handle the odd and even lines of the data line after PR4 equalization.

Figure 15:
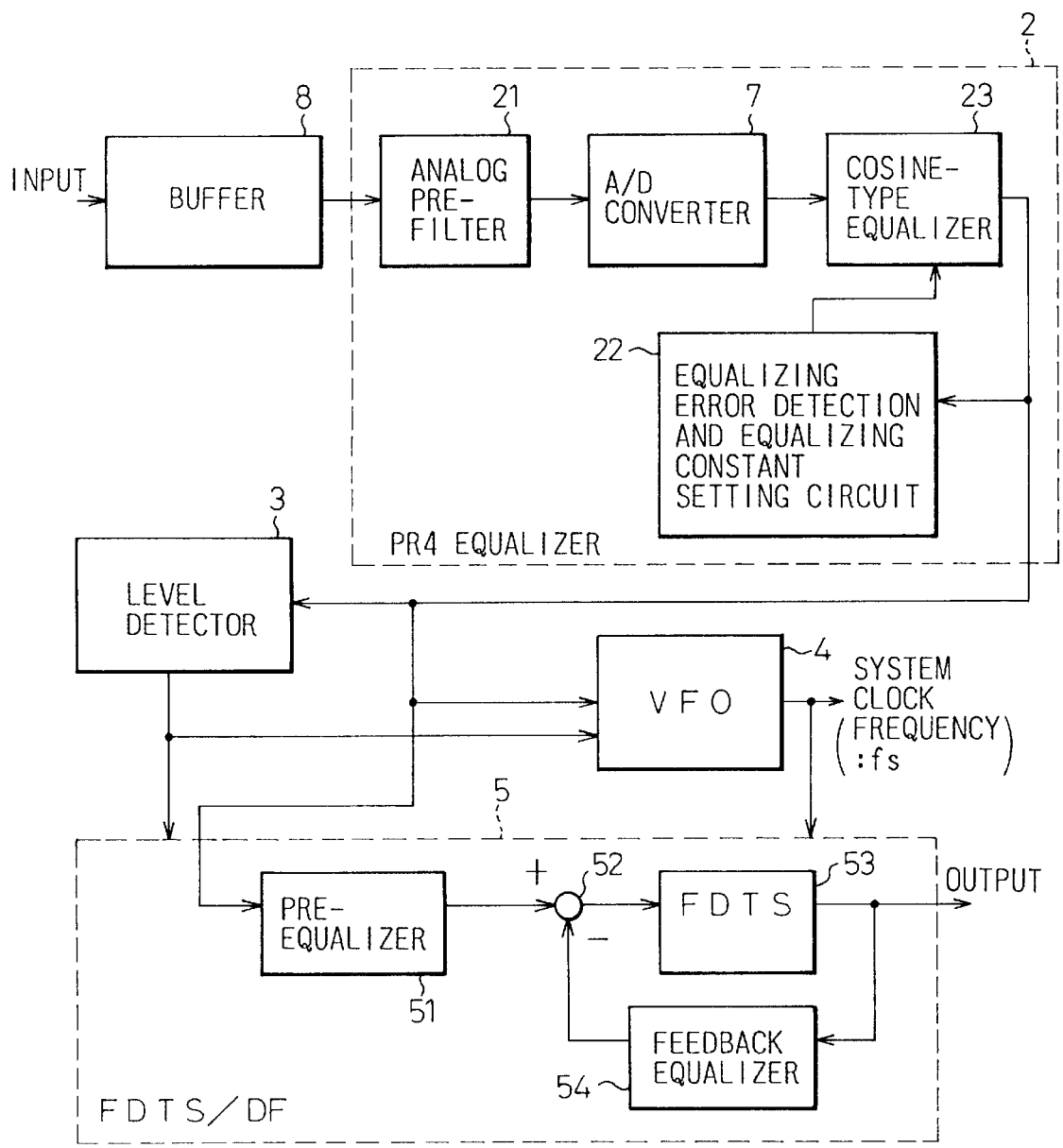
FIG. 15 is a block diagram of the thirteenth embodiment of the present invention.
Figure 16:
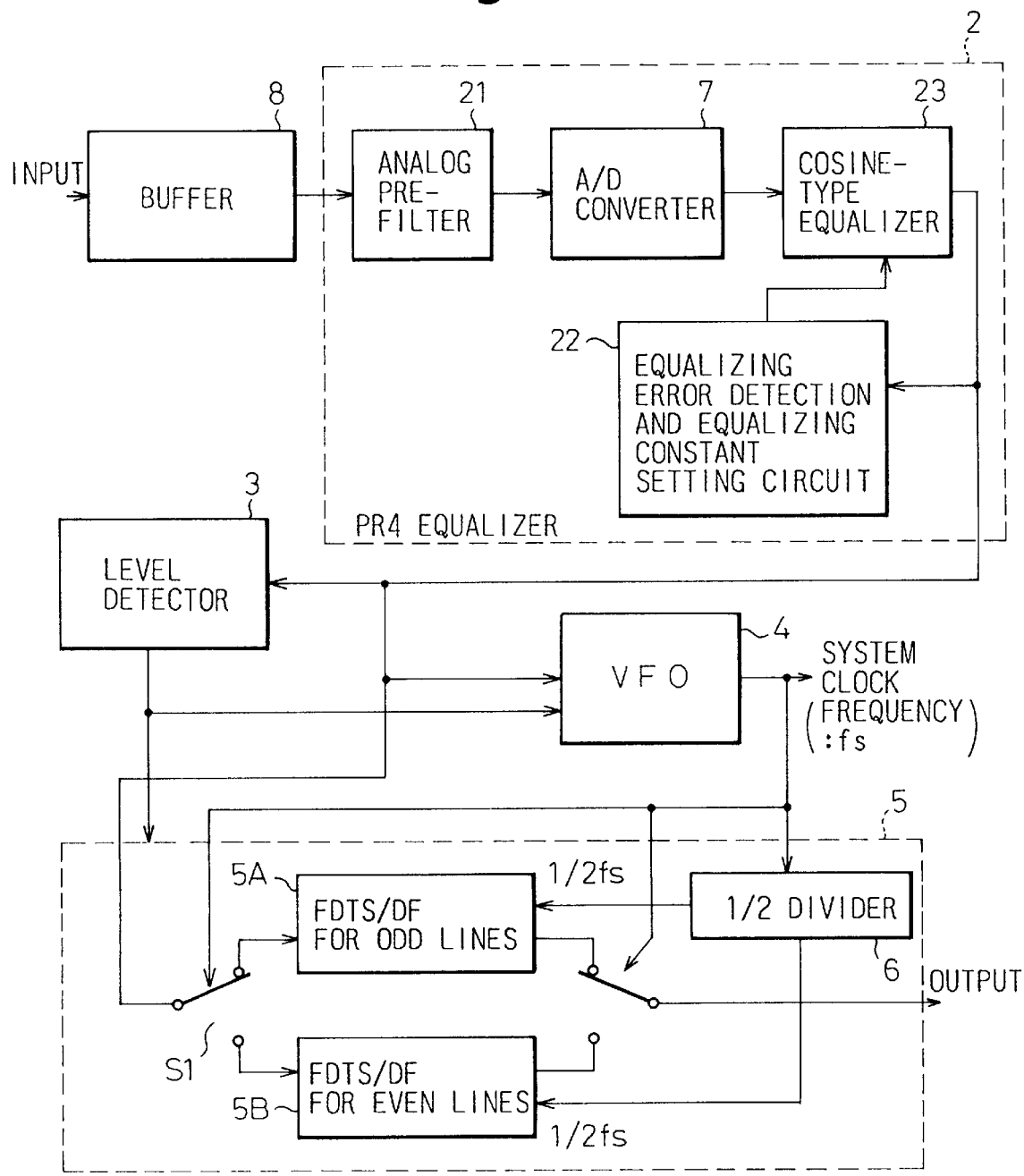
FIG. 16 is a block diagram of the fourteenth embodiment of the present invention.

FIG. 15 is a block diagram the configuration of the thirteen embodiment of a decoding circuit for a magnetic recording and reading system according to the present invention, this embodiment differing from the ninth embodiment of a decoding circuit for a magnetic recording and reading system which is shown in FIG. 11 only with respect to the addition of an A/D converter 7 within the PR4 equalizer 2. FIG. 16 is a block diagram the configuration of the fourteenth embodiment of a decoding circuit for a magnetic recording and reading system according to the present invention, this embodiment differing from the tenth embodiment of a decoding circuit for a magnetic recording and reading system which is shown in FIG. 12 only with respect to the addition of an A/D converter 7 within the PR4 equalizer 2. Therefore, elements which correspond to elements already described are assigned the same reference numerals, and will not be described herein.

In the thirteenth and fourteenth embodiments of a decoding circuit for a magnetic recording and reading system, the input playback signal is input to a PR4 equalizer 2 via a buffer 8. In the thirteenth and fourteenth embodiments, the PR4 equalizer 2 comprises an analog pre-filter 21, an A/D converter 7 which converts the output signal therefrom to digital form, an equalizing error detection and equalizing constant setting circuit 22, and a self-adaptive cosine-type equalizer 23. In the thirteenth and fourteenth embodiments, all processing beyond the A/D converter 7 is performed digitally. The self-adaptive cosine-type equalizer 23 operates so that the error difference between its output and the PR4 target waveform is a minimum. A signal equalized by a PR4 equalizer 2 configured in this manner is input to the level detector 3, the VFO 4 for the purpose of clock extraction, and the FDTS/DF 5. Additionally, as in the cases of the ninth and tenth embodiments, a general AGC loop is not provided, a sampled point amplitude corresponding to the binary data value of 1 is detected at the level detector 3, and this is then input, from the level detector 3, to the VFO 4 and the FDTS/DF 5 as a reference level.

The FDTS/DF 5 in the thirteenth embodiment, as is the case in the ninth embodiment, treats the data line after PR4 equalization as a single data line, whereas in the fourteenth embodiment, as in the tenth embodiment, there are two FDTS/DFs, 5A and 5B, which independently handle the odd and even lines of the data line after PR4 equalization.

Figure 17:
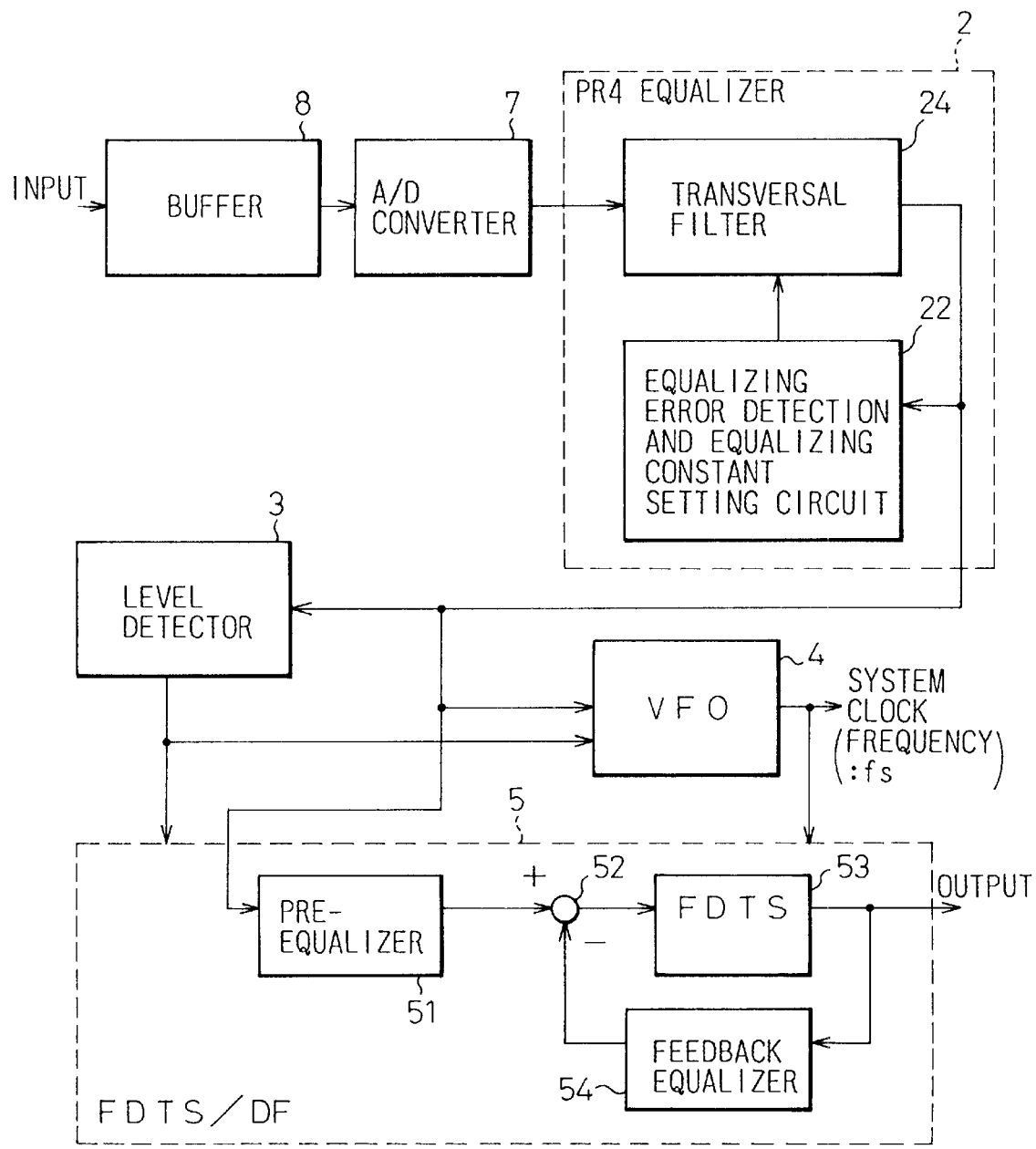
FIG. 17 is a block diagram of the fifteenth embodiment of the present invention.
Figure 18:
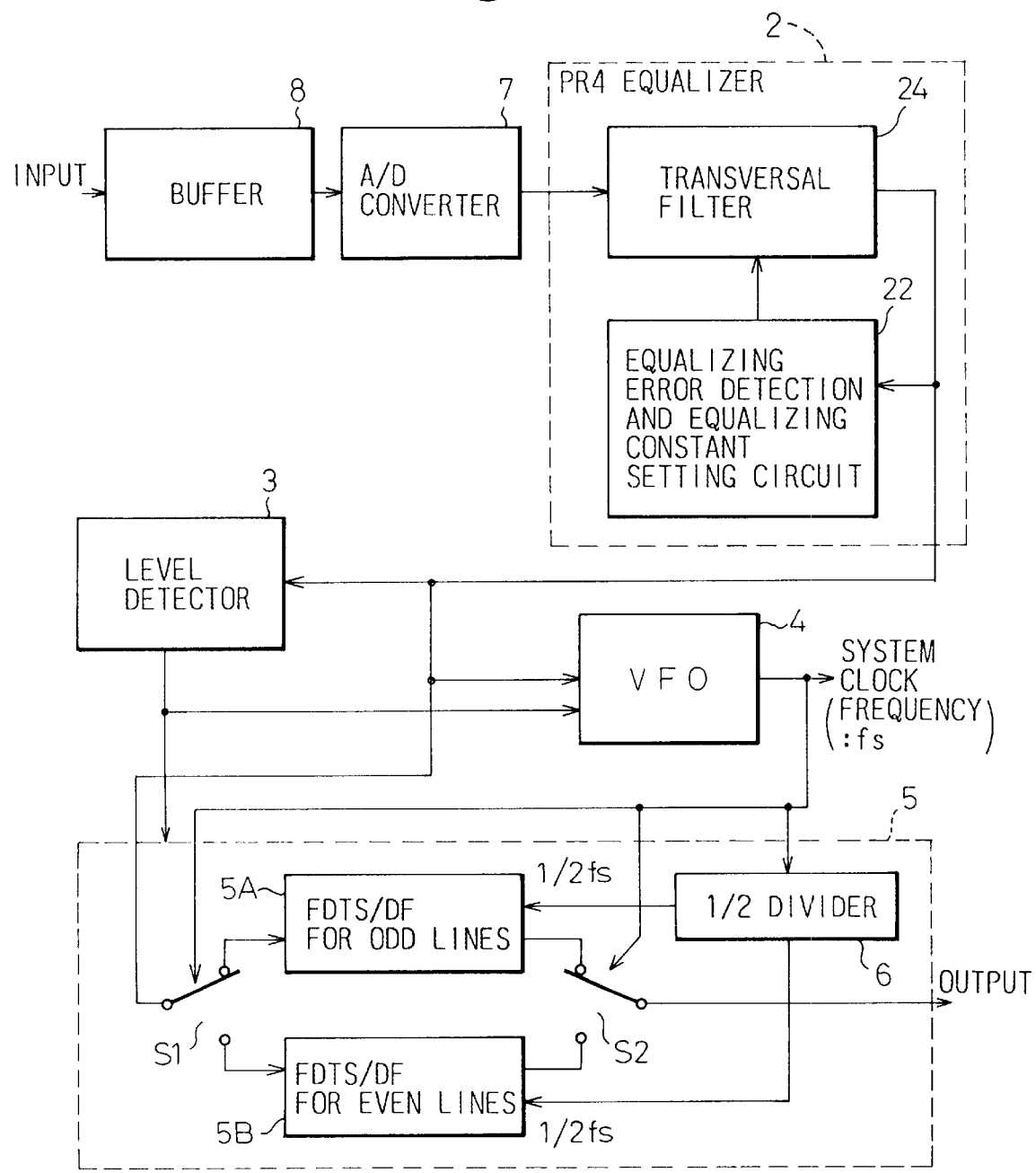
FIG. 18 is a block diagram of the sixteenth embodiment of the present invention.

FIG. 17 is a block diagram the configuration of the fifteenth embodiment of a decoding circuit for a magnetic recording and reading system according to the present invention, this embodiment differing from the ninth embodiment of a decoding circuit for a magnetic recording and reading system which is shown in FIG. 11 only with respect to the addition of an A/D converter 7 to the input end of the PR4 equalizer 2, and with respect to the internal configuration of the PR4 equalizer 2 which accompanies the addition of this A/D converter 7. FIG. 18 is a block diagram of the configuration of the sixteenth embodiment of a decoding circuit for a magnetic recording and reading system according to the present invention, this embodiment differing from the tenth embodiment of a decoding circuit for a magnetic recording and reading system which is shown in FIG. 12 only with respect to the addition of an A/D converter 7 to the input end of the PR4 equalizer 2, and with respect to the internal configuration of the PR4 equalizer 2 which accompanies the addition of this A/D converter 7. Therefore, elements which correspond to elements already described are assigned the same reference numerals, and will not be described herein.

In the fifteen and sixteenth embodiments, an input playback signal is output to the A/D converter 7 via the buffer 8, this signal being converted to digital form by the A/D converter 7, after which it is input to the PR4 equalizer 2.

In the fifteenth and sixteenth embodiments, because a digitally converted signal is input to the PR4 equalizer 2, there is no analog pre-filter provided, there being provided a self-adaptive type of digital equalizer such as a transversal filter 24, and an equalizing error detection and equalizing constant setting circuit 22. The transversal filter 24 operates so that the difference between the output thereof and the PR4 target waveform is minimum.

The signal equalized by the PR4 equalizer configured in the above-described manner is input to the level detector 3, the VFO 4 for the purpose of clock extraction, and the FDTS/DF 5. Additionally, as in the cases of the ninth and tenth embodiments, a general AGC loop is not provided and a sampled point amplitude corresponding to the binary data value of 1 is detected at the level detector 3, this then being input from the level detector 3 to the VFO 4 and the FDTS/DF 5 as a reference level. The FDTS/DF 5 in the fifteenth embodiment, as is the case in the ninth embodiment, treats the data line after PR4 equalization as a single data line, whereas, in the sixteenth embodiment, similar to the tenth embodiment, there are two FDTS/DFs, 5A and 5B, which independently handle the odd and even lines of the data line after PR4 equalization.

As described above, it is also possible to perform level detection by generating the signal level corresponding to the value of 1 in the detection system, using a reference level generating system, this reference level being applied as information to the detection system beforehand.

Figure 19:
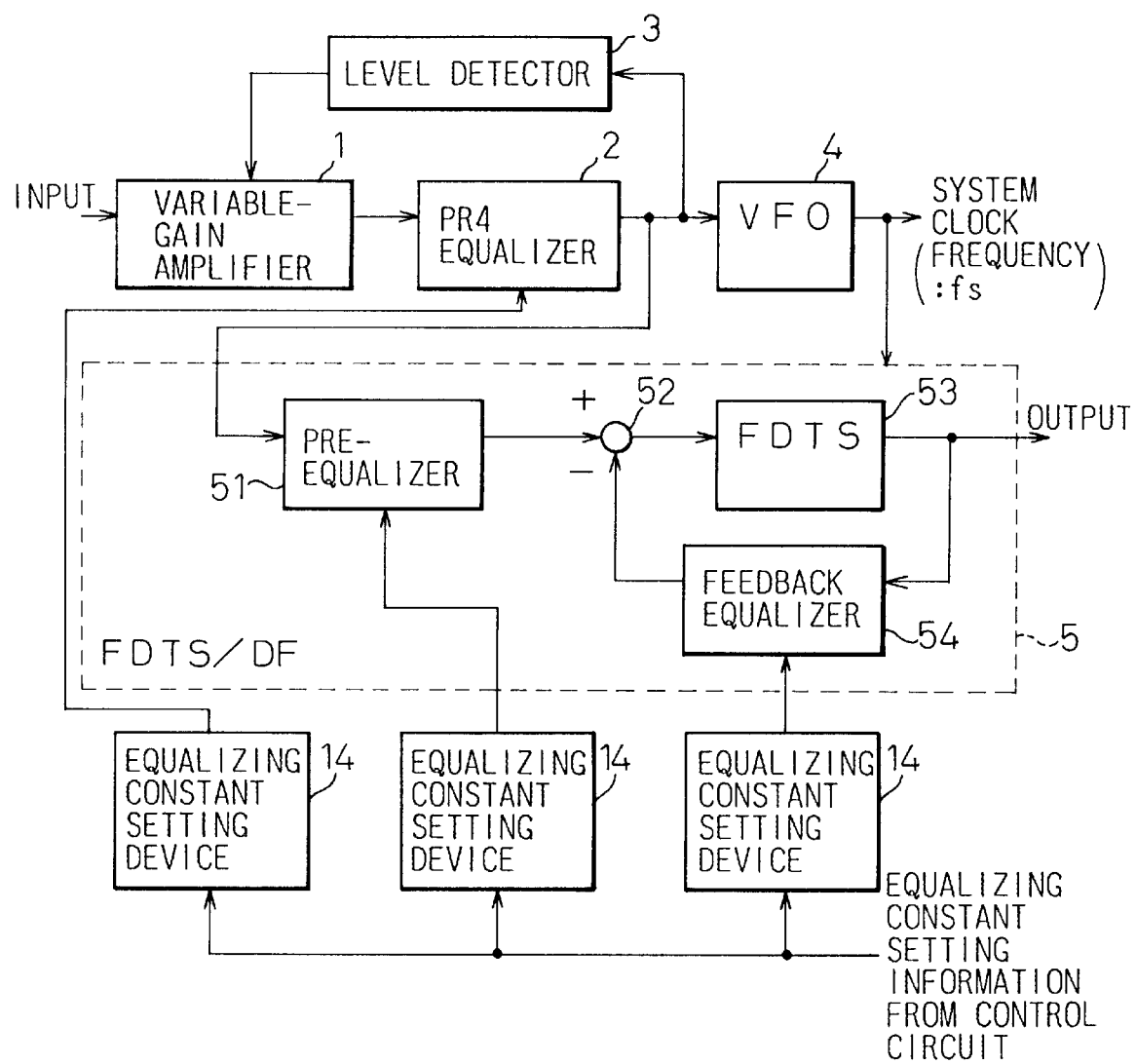
FIG. 19 is a block diagram which shows an embodiment of the present invention in which it is possible to set the equalizing constant from outside the read/write circuit.

Furthermore, in all of the above-described embodiments, the equalizing constants of the PR4 equalizer 2, the pre-equalizer 51, and the feedback equalizer 54, as shown in FIG. 19, are set by means of equalizing constants which are set by an equalizing constant setting device 14, based data transmitted by the control circuit which was described with reference to FIG. 1B. In FIG. 19, there is only one FDTS/DF 5 shown, but this would be the same in the case of two FDTS/DFs 5.

Figure 20:
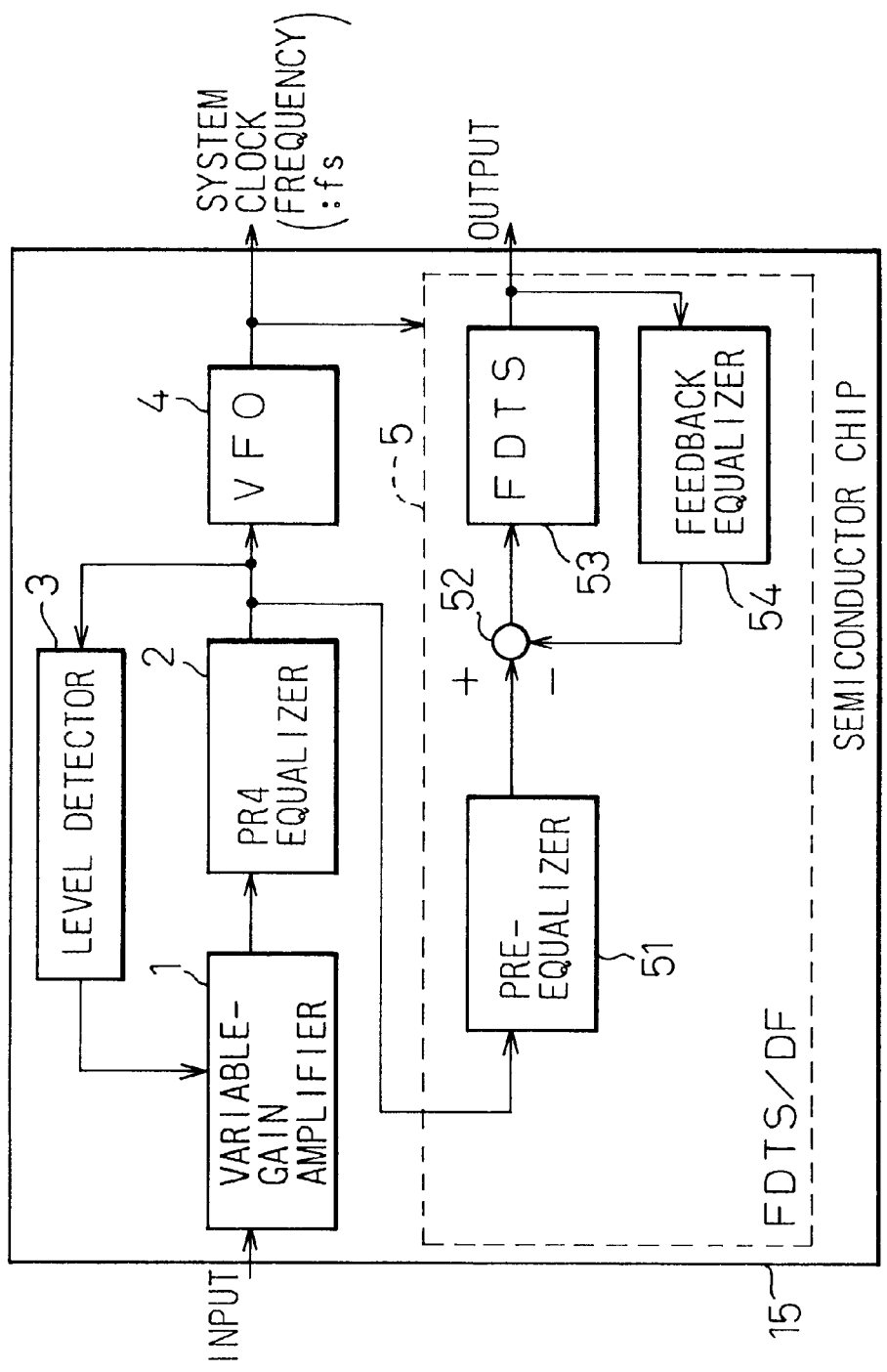
FIG. 20 is a block diagram which shows an embodiment of the present invention in which the decoding circuit of the read/write circuit is formed on the same chip.

In the previously described embodiments, it is possible, as shown in FIG. 20, to form on a single semiconductor chip 15 the variable-gain amplifier 1, the PR4 equalizer 2, the level detector 3, and VFO 4, which form the AGC loop, and the FDTS/DF 5 which operates in accordance with the system clock, which is the output of the VFO 4. In this manner, by forming the circuit components which make up the AGC loop, the VFO 4, and the FDTS/DF 5 on the same semiconductor chip 15, it is possible to achieve stable AGC operation, and further possible to supply a stable system clock of a high frequency, and to improve the overall reliability of the decoding circuit.

As described in detail above, according to the present invention, by combining PR4 equalization with a fixed-delay tree search/decision feedback decoder which handles arbitrary equalization waveforms, implementation is possible with a relatively simple configuration, and further it is easy to perform clock extraction. Additionally, by using a PR4 equalizer which is capable of independent processing of even and odd data lines, it is possible to achieve a high-speed decoding operation in decoding circuit of a magnetic recording and reading system.

What is claimed is:

1. A decoding circuit for a magnetic recording and reading system, which is connected to an output of an amplification means for amplifying an analog signal for the purpose of obtaining digital information in the form of a 1 or a 0 value from an analog signal played back from a magnetic medium, and which includes a level-detecting system and a level-setting system which presets the signal level to be taken as the value of 1, said decoding circuit comprising:

a variable-gain amplifier which is within said level-setting system and which has a gain that can be varied;

an adaptive equalizer which is within said level-setting system, and which is further connected to an output of said variable-gain amplifier, and which has characteristics for the purpose of equalizing an input waveform to a target equalization waveform;

a level-detecting device which is within said level-setting system, and which accepts an output signal from said adaptive equalizer as an input signal, and which further feeds back an output signal to said variable-gain amplifier as an AGC loop control signal for the purpose of controlling the gain of said variable-gain amplifier;

a variable-frequency oscillator which is within said detection system, and which is connected to the output of said adaptive equalizer, and which further generates a system clock; and a tree-search type decision feedback type decoding means in a decision section, which is connected to said adaptive equalizer, and which decodes a data line which appears in the equalized output thereof.

2. A decoding circuit for a magnetic recording and reading system according to claim 1, comprising:

a decoding means which performs decoding of only the even lines of data;

a decoding means which performs decoding of only the odd lines of data; and a clock-dividing means which divides said system clock which is supplied to said two decoding means in half.

3. A decoding circuit for a magnetic recording and reading system, which is connected to an output of an amplification means for amplifying an analog signal for the purpose of obtaining digital information in the form of a 1 or a 0 value from an analog signal played back from a magnetic medium, and which includes a reference level generating and detecting system which detects the level of a signal to be taken as a value of 1 and outputs a reference level signal, said decoding circuit comprising:

a buffer in said reference level generating system;

an adaptive equalizer which is within said level-setting system, and which is further connected to an output of said buffer, and which has characteristics for the purpose of equalizing an input waveform to a target equalization waveform;

a level-detecting device which is within said reference level generating signal, and which accepts an output signal from said adaptive equalizer as an in put signal and detects the level thereof, and further which outputs a reference level signal;

a variable-frequency oscillator which is within said detection system, and which is connected to the output of said adaptive equalizer, and which further generates a system clock; and a tree-search type decision feedback type decoding means within said detection system, which is connected to said adaptive equalizer, and which decodes a data line which appears in the equalized output thereof.

4. A decoding circuit for a magnetic recording and reading system according to claim 3, wherein said tree-search type decision feedback type decoding means comprises:

a decoding means which performs decoding of only the even lines of data;

a decoding means which performs decoding of only the odd lines of data; and a clock-dividing means which divides said system clock which is supplied to said two decoding means in half.

5. A decoding circuit for a magnetic recording and reading system according to claim 1, wherein said decision feedback type decoding means comprises a pre-equalizer which is able to set an amplitude over a range of M sampled points, where M is an integer of 3 or greater, with respect to a single sample input of the sampled point line, which corresponds to a binary value of 1, of the signal waveform which is PR4 equalized.

6. A decoding circuit for a magnetic recording and reading system according to claim 5, further comprising a feedback equalizer which provides an output of N samples from the end of a sample line of M samples, where the condition M>N is satisfied, in accordance with the binary 1 signal from said decision section, which uses a tree search.

7. A decoding circuit for a magnetic recording and reading system according to one of claim 2, wherein said decision feedback type decoding means has a pre-equalizer for odd lines and a pre-equalizer for even lines, said equalizers being capable of setting an amplitude over a range of M sampled points, where M is an integer of 3 or greater, with respect to a single sample input of the sampled sub-data line which is an even or an odd data line, respectively, and which corresponds to a binary value of 1, of the signal waveform which is PR4 equalized.

8. A decoding circuit for a magnetic recording and reading system according to claim 7, further comprising a feedback equalizer for even lines and a feedback equalizer for odd lines which provide an output of N samples from the end of a sample line of M samples, where the condition M>N is satisfied, in accordance with the binary 1 signal from said decision section, which uses a tree search.

9. A decoding circuit for a magnetic recording and reading system according to one of claim 1 through claim 8, wherein said adaptive equalizer comprises a pre-filter which performs analog processing, and a cosine-type equalizer with the equivalent of three taps which is connected to the output end thereof, and wherein analog processing is performed after said adaptive equalizer.

10. A decoding circuit for a magnetic recording and reading system according to one of claim 1 through claim 8, wherein said adaptive equalizer comprises a pre-filter which performs analog processing and a cosine-type equalizer with the equivalent of three taps, an A/D converter which converts an analog signal to a digital signal being provided at the output end of said adaptive equalizer, wherein digital processing is performed after said A/D converter.

11. A decoding circuit for a magnetic recording and reading system according to one of claim 1 through claim 8 wherein said adaptive equalizer comprises:
   a filter which performs analog processing;
   an A/D converter provided at the output end of said filter; and
   a digital cosine-type equalizer with the equivalent of three taps, which processes the digital signal from said A/D converter.

12. A decoding circuit for a magnetic recording and reading system according to one of claim 1 through claim 8 wherein an A/D converter is provided at the input end of said adaptive equalizer, and further wherein said adaptive equalizer has a digital type transversal filter which processes a digital signal from said A/D converter.

13. A decoding circuit for a magnetic recording and reading system according to one of claim 1 through claim 8 wherein said adaptive equalizer is a self-adaptive type equalizer which is capable of always performing adaptive equalization, regardless of a change in the quality of the input signal.

14. A decoding circuit for a magnetic recording and reading system according to one of claim 1 through claim 8 wherein said PR4 equalizer, said equalizer, and said feedback equalizer are programmable so as to enable arbitrary external setting of the equalizing constants thereof, in response to the data transfer speed, which is the operating speed of the apparatus.

15. A decoding circuit for a magnetic recording and reading system according to one of claim 1 through claim 8 wherein minimally said variable-gain amplifier, said adaptive equalizer, said level detecting detector, said VFO and said decision feedback type decoding means are formed on one and the same semiconductor chip.

16. A decoding circuit for a magnetic recording and reading system according to claim 4, wherein said decision feedback type decoding means has a pre-equalizer for odd lines and a pre-equalizer for even lines, said equalizers being capable of setting an amplitude over a range of M sampled points, where M is an integer of 3 or greater, with respect to a single sample input of the sampled sub-data line which is an even or an odd data line, respectively, and which corresponds to a binary value of 1, of the signal waveform which is adaptively equalized.

17. A decoding circuit for a magnetic recording and reading system according to claim 16, further comprising a feedback equalizer for even lines and a feedback equalizer for odd lines which provide an output of N samples from the end of a sample line of M samples, where the condition M>N is satisfied, in accordance with the binary 1 signal from said decision section, which uses a tree search.

18. A decoding circuit for a magnetic recording and reading system according to claim 16, wherein said adaptive equalizer comprises a pre-filter which performs analog processing, and a cosine-type equalizer with the equivalent of three taps which is connected to the output end thereof, and wherein analog processing is performed after said adaptive equalizer.

19. A decoding circuit for a magnetic recording and reading system according to claim 16, wherein said adaptive equalizer comprises a pre-filter which performs analog processing and a cosine-type equalizer with the equivalent of three taps, an A/D converter which converts an analog signal to a digital signal being provided at the output end of said adaptive equalizer, wherein digital processing is performed after said A/D converter.

20. A decoding circuit for a magnetic recording and reading system according to claim 16, wherein said adaptive equalizer comprises:
   a filter which performs analog processing;
   an A/D converter provided at the output end of said filter; and
   a digital cosine-type equalizer with the equivalent of three taps, which processes the digital signal from said A/D converter.

21. A decoding circuit for a magnetic recording and reading system according to claim 16 wherein an A/D converter is provided at the input end of said adaptive equalizer, and further wherein said adaptive equalizer has a digital type transversal filter which processes a digital signal from said A/D converter.

22. A decoding circuit for a magnetic recording and reading system according to claim 16 wherein said adaptive equalizer is a self-adaptive type equalizer which is capable of always performing adaptive equalization, regardless of a change in the quality of the input signal.

23. A decoding circuit for a magnetic recording and reading system according to claim 16 wherein said adaptive equalizer, said equalizer, and said feedback equalizer are programmable so as to enable arbitrary external setting of the equalizing constants thereof, in response to the data transfer speed, which is the operating speed of the apparatus.

24. A decoding circuit for a magnetic recording and reading system according to claim 16 wherein minimally said variable-gain amplifier, said adaptive equalizer, said level detecting detector, said VFO and said decision feedback type decoding means are formed on one and the same semiconductor chip.

25. A decoding circuit for a magnetic recording and reading system according to claim 3, wherein said decision feedback type decoding means comprises a pre-equalizer which is able to set an amplitude over a range of M sampled points, where M is an integer of 3 or greater, with respect to a single sample input of the sampled point line, which corresponds to a binary value of 1, of the signal waveform which is adaptive equalized.

26. A decoding circuit for a magnetic recording and reading system according to claim 25, further comprising a feedback equalizer which provides an output of N samples from the end of a sample line of M samples, where the condition M>N is satisfied, in accordance with the binary 1 signal from said decision section, which uses a tree search.

27. A decoding circuit for a magnetic recording and reading system according to claim 26, wherein said adaptive equalizer comprises a pre-filter which performs analog processing, and a cosine-type equalizer with the equivalent of three taps which is connected to the output end thereof, and wherein analog processing is performed after said adaptive equalizer.

28. A decoding circuit for a magnetic recording and reading system according to claim 26, wherein said adaptive equalizer comprises a pre-filter which performs analog processing and a cosine-type equalizer with the equivalent of three taps, an A/D converter which converts an analog signal to a digital signal being provided at the output end of said adaptive equalizer, wherein digital processing is performed after said A/D converter.

29. A decoding circuit for a magnetic recording and reading system according to claim 26, wherein said PR4 equalizer comprises:

a filter which performs analog processing;

an A/D converter provided at the output end of said filter; and a digital cosine-type equalizer with the equivalent of three taps, which processes the digital signal from said A/D converter.

30. A decoding circuit for a magnetic recording and reading system according to claim 26 wherein an A/D converter is provided at the input end of said adaptive equalizer, and further wherein said adaptive equalizer has a digital type transversal filter which processes a digital signal from said A/D converter.

31. A decoding circuit for a magnetic recording and reading system according to claim 26 wherein said adaptive equalizer is a self-adaptive type equalizer which is capable of always performing adaptive equalization, regardless of a change in the quality of the input signal.

32. A decoding circuit for a magnetic recording and reading system according to claim 26 wherein said adaptive equalizer, said equalizer, and said feedback equalizer are programmable so as to enable arbitrary external setting of the equalizing constants thereof, in response to the data transfer speed, which is the operating speed of the apparatus.

33. A decoding circuit for a magnetic recording and reading system according to claim 26 wherein minimally said variable-gain amplifier, said adaptive equalizer, said level detecting detector, said VFO and said decision feedback type decoding means are formed on one and the same semiconductor chip.

* * * * *

UNITED STATES PATENT AND TRADEMARK OFFICE
CERTIFICATE OF CORRECTION

PATENT NO. : 5,923,708
DATED : July 13, 1999
INVENTOR(S) : Mutoh

It is certified that error appears in the above-identified patent and that said Letters Patent is hereby corrected as shown below:

Column 14, line 13, delete "in put" and insert --input-- therefor

Column 16, line 50, delete "adaptive"

and insert --adaptively--

Column 17, line 6, delete "PR4" and insert --adaptive-- therefor

Signed and Sealed this

Twenty-seventh Day of March, 2001

Attest:

NICHOLAS P. GODICI

Attesting Officer

*Acting Director of the United States Patent and Trademark Office*